United States Patent
Sivich et al.

(10) Patent No.: US 10,809,693 B2
(45) Date of Patent: Oct. 20, 2020

(54) MANUFACTURING DEVICE CONTROL BASED ON METROLOGY DATA

(71) Applicant: THE BOEING COMPANY, Chicago, IL (US)

(72) Inventors: Lorrie Sivich, Federal Way, WA (US); Robert W. Grube, Edmonds, WA (US); Joseph Doyle, Mount Pleasant, SC (US); Farshad Forouhar, Lake Forest Park, WA (US); Jerry D. Zayic, Cle Elum, WA (US); Gregg W. Podnar, Lakewood, OH (US); Carrie Rule, Normandy Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 230 days.

(21) Appl. No.: 16/004,105

(22) Filed: Jun. 8, 2018

(65) Prior Publication Data

US 2019/0377319 A1 Dec. 12, 2019

(51) Int. Cl.
*G06F 11/30* (2006.01)
*G05B 19/401* (2006.01)
(Continued)

(52) U.S. Cl.
CPC .......... *G05B 19/401* (2013.01); *B25J 9/1694* (2013.01); *G01B 11/002* (2013.01); *G05B 2219/31293* (2013.01)

(58) Field of Classification Search
CPC .................................................. G05B 19/401
See application file for complete search history.

(56) References Cited

U.S. PATENT DOCUMENTS

| | | |
|---|---|---|
| 2008/0147222 A1 | 6/2008 | McIntyre et al. |
| 2015/0281356 A1 | 10/2015 | Maturana et al. |
| 2016/0288331 A1 | 10/2016 | Sivich et al. |

FOREIGN PATENT DOCUMENTS

| | | | |
|---|---|---|---|
| WO | 2018089252 A1 | 5/2018 | |
| WO | WO 2018/089252 | * | 5/2018 |

OTHER PUBLICATIONS

Communication pursuant to Article 94(3) EPC for Application No. 19177685.5 dated Nov. 14, 2019, 7 pgs.
(Continued)

*Primary Examiner* — Phuong Huynh
(74) *Attorney, Agent, or Firm* — Moore IP Law

(57) ABSTRACT

A method includes receiving topic names from a metrology interface device, where the topic names correspond to data generated by metrology devices associated with a manufacturing operation. The method also includes accessing a data stream from the metrology interface device. The data stream includes converted metrology data (in a common format) from the metrology devices and corresponding topic names. The method further includes extracting first converted metrology data from the data stream based on a first topic name of the topic names. The first converted metrology data is generated by converting first metrology data from a first metrology device of the metrology devices to the first converted metrology data having the common format. The method also includes comparing the first converted metrology data to a specification, detecting a condition based on the comparison, and sending a command to a manufacturing device based on the condition.

20 Claims, 7 Drawing Sheets

(51) Int. Cl.
*B25J 9/16* (2006.01)
*G01B 11/00* (2006.01)

(56) References Cited

OTHER PUBLICATIONS

European Search Report for Application No. 19177685.5 dated Oct. 28, 2019, 4 pgs.
Imkamp, D. et al. "Challenges and trends in manufacturing measurement techonology—the 'Industrie 4.0' concept;" J. Sens. Sens. Syst. 5, 325-335; 2016; 11 pgs.

* cited by examiner

MANUFACTURING DEVICE CONTROL BASED ON METROLOGY DATA

FIELD OF THE DISCLOSURE

The present disclosure is generally related to controlling manufacturing devices based on metrology data.

BACKGROUND

In automated or semi-automated manufacturing, a manufacturing system controls manufacturing devices to assemble a product or perform a task. To illustrate, the manufacturing system can be coupled to a robotic arm (e.g., a manufacturing device) and can send commands to move the robotic arm in response to receiving input indicating that the robotic arm is to be moved.

The manufacturing system can receive position information (e.g., coordinates of various parts) as metrology data from one or more metrology devices. Often, manufacturing systems and metrology devices come from different suppliers, and as a result, the data or file format output by a metrology device may not be natively compatible with the manufacturing system. Accordingly, an adapter can be used to convert the data output by the metrology device to data that is usable by the manufacturing system.

Generally, such adapters are custom built to link one metrology device to one manufacturing system. Thus, if the metrology device fails and is replaced with (or is upgraded to) another type of metrology device that generates a different type of data or generates data in a different file format, a new adapter is needed to link the metrology device to the manufacturing system. Creating a new adapter is time consuming and expensive, and automated or semi-automated manufacturing generally has to stop until the new adapter is created and tested. Similarly, if a new manufacturing system is added to a production line, a new adapter may be needed to link the new manufacturing system to existing metrology devices, resulting in delays and expenses associated with creating a new adapter.

SUMMARY

In a particular implementation, a method includes receiving a list of topic names from a metrology interface device. The list of topic names corresponds to data generated by multiple metrology devices associated with a manufacturing operation. The metrology interface device is configured to convert metrology data received from the multiple metrology devices to a common format. The method also includes accessing a data stream from the metrology interface device. The data stream includes converted metrology data from the multiple metrology devices and corresponding topic names. The method further includes extracting first converted metrology data from the data stream based on a first topic name of the list of topic names. The first converted metrology data is generated by converting first metrology data from a first metrology device of the multiple metrology devices to the first converted metrology data having the common format. The method also includes comparing the first converted metrology data to a specification, detecting a condition based on the comparison, and sending a command to a manufacturing device based on the condition.

In another particular implementation, a device includes a first communication interface, a processor, and a second communication interface. The first communication interface is configured to receive a list of topic names from a metrology interface device. The list of topic names corresponding to data generated by multiple metrology devices associated with a manufacturing operation. The metrology interface device is configured to convert metrology data received from the multiple metrology devices to a common format. The first communication interface is also configured to access a data stream from the metrology interface device. The data stream includes converted metrology data from the multiple metrology devices and corresponding topic names. The processor is configured to extract first converted metrology data from the data stream based on a first topic name of the list of topic names. The first converted metrology data is generated by converting first metrology data from a first metrology device of the multiple metrology devices to the first converted metrology data having the common format. The processor is also configured to compare the first converted metrology data to a specification, to detect a condition based on the comparison and to send a command to a manufacturing device based on the condition.

A computer-readable storage device stores instructions that, when executed by a processor, cause the processor to perform operations including receiving a list of topic names from a metrology interface device. The list of topic names corresponding to data generated by multiple metrology devices associated with a manufacturing operation. The metrology interface device is configured to convert metrology data received from the multiple metrology devices to a common format. The operations also include accessing a data stream from the metrology interface device. The data stream includes converted metrology data from the multiple metrology devices and corresponding topic names. The operations further include extracting first converted metrology data from the data stream based on a first topic name of the list of topic names. The first converted metrology data is generated by converting first metrology data from a first metrology device of the multiple metrology devices to the first converted metrology data having the common format. The operations also include comparing the first converted metrology data to a specification, detecting a condition based on the comparison, and sending a command to a manufacturing device based on the condition.

The features, functions, and advantages described herein can be achieved independently in various implementations or may be combined in yet other implementations, further details of which can be found with reference to the following description and drawings.

DETAILED DESCRIPTION

Figure 1:
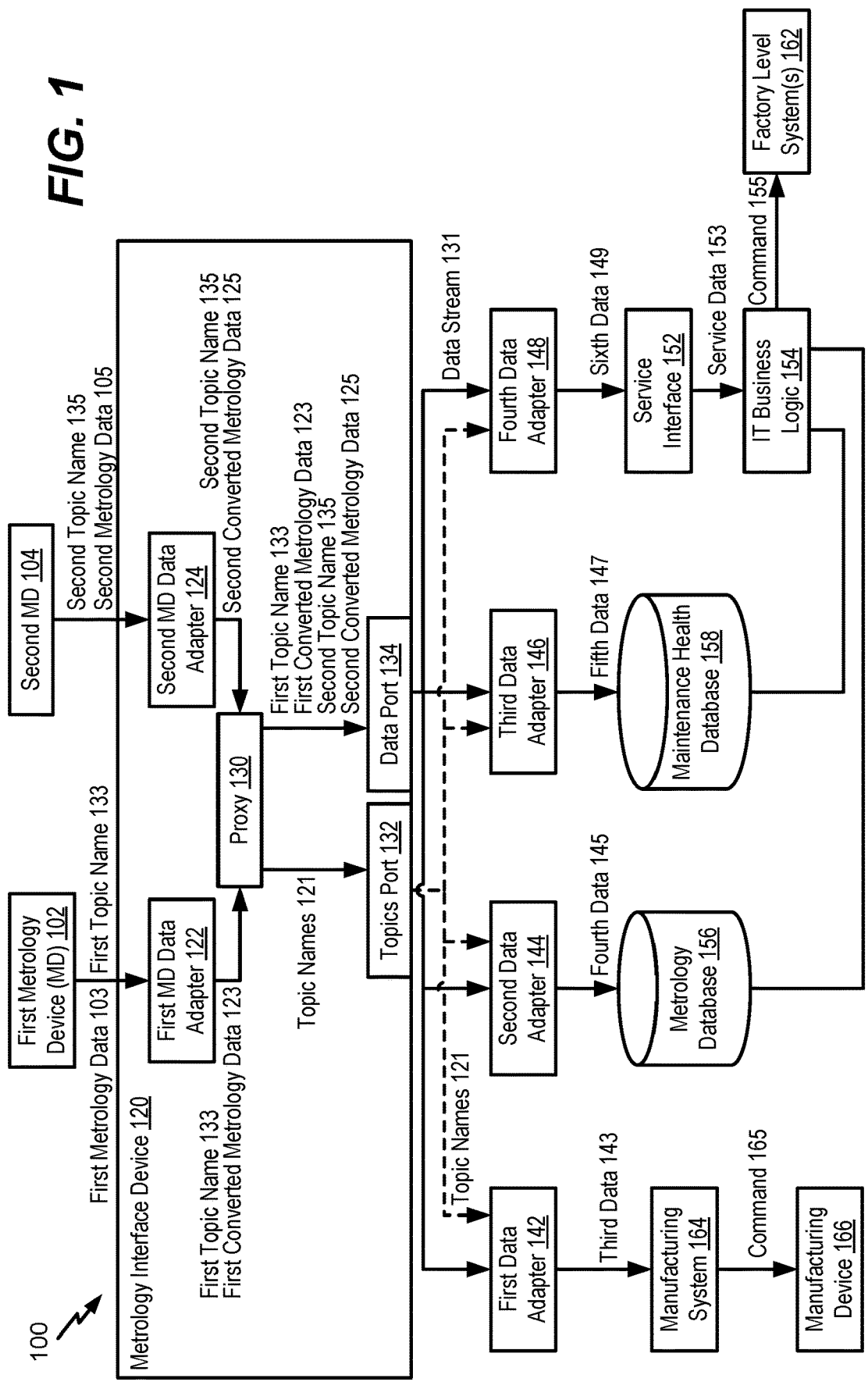
FIG. 1 is a block diagram that illustrates a system operable to control a manufacturing device based on metrology data.

Implementations described herein are directed to manufacturing device control based on metrology data. Metrology data includes one-dimensional data, multi-dimensional data (e.g., n-dimensional data), or both. For example, the metrology data includes one-dimensional data (e.g., encoder position, temperature, pressure, or distance), two-dimensional data (e.g., vision system features), three-dimensional data (e.g., laser tracker data), six-dimensional data (e.g., frames data, transform data), or a combination thereof. In a particular example, the metrology data includes vector data. To illustrate, the metrology data includes a vector indicating a first measured value (e.g., x-coordinates), a second measured value (e.g., y-coordinates), a third measured value (e.g., z-coordinates), a fourth measured value (e.g., a roll value), a fifth measured value (e.g., a pitch value), and a sixth measured value (e.g., a yaw value). A metrology interface device is configured to be coupled to multiple metrology devices and a manufacturing device, to a metrology device and multiple manufacturing devices, or to multiple metrology devices and multiple manufacturing systems. The metrology devices include, for example, an encoder, a camera system, a laser tracker, a load sensor, a flow sensor, a vibration sensor, an acoustic system, an imaging system, a distance sensor, a strain sensor, a photogrammetry system, a temperature sensor, a pressure sensor, another type of measurement device, or a combination thereof. The metrology interface device is configured to receive metrology data from the metrology devices. The metrology data received from a first metrology device can include different information (e.g., a different type of information) than metrology data received from a second metrology device. Further, the metrology data received from various metrology devices can be in different formats, can be communicated using different protocols, or can differ in other ways. For example, a first metrology device can output first metrology data that includes a first set of coordinates in a first coordinate system (e.g., a Cartesian coordinate system, a polar coordinate system, or another coordinate system) and a first reference position (e.g., a first origin of the coordinate system). In this example, the first set of coordinates can be output in a first file format (such as a text file, a binary file, comma separated values (CSV)), according to a first data template that indicates a first order of data elements, a first set of keywords, etc. Further, the first set of coordinates can be indicated according to first units of measurement (e.g., millimeters, centimeters, inches, or feet). In this example, a second metrology device can output second metrology data that differs from the first metrology data with respect to any one of, or any combination of, the above described features. To illustrate, the second metrology data can be output using a second coordinate system with a second reference position and second units of measurement. As another illustration, the second metrology data can be output according to a second file format that is different from the first file format or according to second data template that is different from the first data template. Further, in some examples, the second metrology device can output second metrology data that is not tied to a particular coordinate system at all, such as load data, temperature, pressure, etc.

The metrology interface device is configured to generate converted metrology data by converting metrology data received in different formats (e.g., from different metrology devices) to the converted metrology data having a common format. In this context, a common format includes, for example, a common file format, common units of measurement, a common coordinate system, a common point of reference, a common data template, or a combination thereof. As a particular example, the metrology interface device can receive a first file including first metrology data (as described above) and generate a second file based on the first file where the second file has the common file format. The second file can include converted metrology data generated by converting the first metrology data from first units of measurement to second metrology data in common units of measurement (e.g., millimeters, centimeters, inches, or feet). Additionally or in the alternative, the metrology interface device can generate the converted metrology data by converting the first metrology data from the first coordinate system to the common coordinate system (e.g., a Cartesian coordinate system, a polar coordinate system, or another coordinate system). Additionally or in the alternative, the metrology interface device can generate the converted metrology data by re-ordering the first metrology data from an ordering and arrangement based on a first data template to an ordering and arrangement based on a common data template.

The metrology interface device outputs the converted metrology data as a data stream. A manufacturing system extracts particular metrology data from the data stream. In some implementations, metrology data from multiple metrology devices can be provided in the data stream. In such implementations, the data stream can include tags or other data identifiers to indicate which metrology device generated particular metrology data in the data stream, to identify a particular measurement indicated by the particular metrology data, to identify a time at which a particular measurement indicated by the particular metrology data was taken, or other identifying information associated with the particular metrology data. The tags or other data identifiers can be used by a manufacturing system to select particular metrology data from the data stream.

In some implementations, more than one manufacturing system can use the data stream. The manufacturing system can be replaced or another manufacturing system can be added without changing the metrology interface device because the metrology interface device is agnostic to manufacturing devices that consume the converted metrology data. For example, the metrology interface receives metrology data from various metrology devices and converts the metrology data to the common format independently of the particular manufacturing systems that use the converted metrology data. The converted metrology data is accessible to manufacturing devices via the data stream. For example, a riveting system can be added that extracts the second file from the data stream without changing the metrology interface device.

Additionally or in the alternative, a metrology device can be replaced without changes to the manufacturing systems. For example, if a first metrology device (e.g., a laser tracker) is replaced by a second metrology device (e.g., a second laser tracker), the metrology interface device receives metrology data (e.g., particular coordinates) having a second format (different from the common format) from the second metrology device. The second format includes, for example, a second file format, second units of measurement, a second coordinate system, a second point of reference, a second data template, or a combination thereof. The metrology interface device generates converted metrology data by converting the metrology data having the second format to the converted metrology data having the common format. The metrology interface device outputs the converted metrology data via the data stream. The alignment system can process the converted metrology data extracted from the data stream without any changes to the alignment system because the converted metrology data has the same format (e.g., the common format) as the converted metrology data received from the metrology interface device prior to replacement of the first metrology device. The ability to add metrology devices without changes to the manufacturing systems and/or the ability to add manufacturing systems without changes to the metrology interface device increases overall system interoperability, adds flexibility, and reduces fragility. When a metrology device is changed or added, the overall manufacturing system can be qualified without a complete functional revalidation of the entire manufacturing system. Metrology devices and manufacturing systems from various vendors can be used concurrently.

FIG. 1 is a block diagram of a system 100 that is operable to perform manufacturing device control based on metrology data. The system 100 includes a metrology interface device 120 that is configured to facilitate communication between metrology devices and manufacturing systems.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The metrology interface device 120 includes a proxy 130 and one or more metrology device (MD) data adapters, including a first MD data adapter 122 and a second MD data adapter 124. In a particular example, the metrology interface device 120 is a network device that is coupled via network interfaces (e.g., communication ports) to metrology devices, such as a first metrology device (MD) 102 and a second MD 104. The first MD 102, the second MD 104, or both, include an encoder, a camera system, a laser tracker, a load sensor, a flow sensor, a vibration sensor, an acoustic system, an imaging system, a distance sensor, a strain sensor, a photogrammetry system, a temperature sensor, a pressure sensor, another type of measurement device, or a combination thereof. The first MD data adapter 122 and the second MD data adapter 124 convert metrology data from a respective metrology device 102 or 104 to a common format. The metrology data from the first MD 102, the second MD 104, or both, includes laser tracker data, encoder position data, vision system feature data, frames data, transform data, photogrammetry data, pressure data, temperature data, another type of measurement data, or a combination thereof. The common format includes, for example, a common file format (e.g., a polygon (ply) file format, a file format for scalar values, a file format for temperature data, another file format), common units of measurement (e.g., millimeters, centimeters, inches, feet, Fahrenheit, Celsius, Kelvin, degrees, or radians), a common coordinate system (e.g., Cartesian coordinates, or polar coordinates), a common point of reference (e.g., a particular geographic location), a common data template, or a combination thereof. For example, the first MD data adapter 122 is configured to receive metrology data from the first MD 102, convert the metrology data to the common format, and provide the converted metrology data to the proxy 130. Since metrology data output by the metrology interface device 120 is in the common format, the metrology data is referred to herein as metrology device agnostic.

The proxy 130 is configured to receive converted metrology data from the first MD data adapter 122 and from the second MD data adapter 124 and to output the converted metrology data as a data stream via a data port 134 of the metrology interface device 120. The proxy 130 includes hardware, software, or both. In FIG. 1, the proxy 130 is coupled, via the first MD data adapter 122, to the first MD 102 and the proxy 130 is coupled, via the second MD data adapter 124, to the second MD 104. In some aspects, the proxy 130 is coupled to fewer than two MDs or more than two MDs. In a particular aspect, the system 100 includes a MD data adapter corresponding to each MD. In some implementations, a particular MD data adapter is coupled to multiple MDs. In some aspects, the proxy 130 is coupled, via fewer than two MD data adapters, to fewer than two MDs. In some aspects, the proxy 130 is coupled, via more than two MD data adapters, to more than two MDs.

In FIG. 1, the proxy 130 is coupled to one or more manufacturing systems, including a service interface 152, information technology (IT) business logic 154, a metrology database 156, a maintenance health database 158, a manufacturing system 164, or a combination thereof. The service interface 152, the IT business logic 154, the metrology database 156, the maintenance health database 158, the manufacturing system 164, or a combination thereof, are configured to perform a manufacturing operation. For example, the manufacturing system 164 is configured to control operations of a manufacturing device 166, such as a robotic arm, a riveting machine, or another factory level system. The service interface 152, the IT business logic 154, the metrology database 156, the maintenance health database 158, the manufacturing system 164, or a combination thereof include hardware, software, or both. The IT business logic 154 is configured to control operations of one or more factory level systems 162. The factory level system(s) 162 are configured to perform manufacturing operations and are located in a factory (or other manufacturing facility).

In FIG. 1, the proxy 130 is coupled via a first data adapter 142 to the manufacturing system 164, and the manufacturing system 164 is coupled to the manufacturing device 166. The proxy 130 is coupled to one or more databases, including the metrology database 156 and the maintenance health database 158. For example, in FIG. 1, the proxy 130 is coupled via a second data adapter 144 to the metrology database 156. The metrology database 156 is configured to store metrology data. For example, the metrology database 156 is configured to maintain records of measurements performed by the first MD 102, the second MD 104, or both. The proxy 130 in FIG. 1 is also coupled via a third data adapter 146 to the maintenance health database 158. The maintenance health database 158 is configured to store records indicating whether the first MD 102, the second MD 104, or both, are performing within particular operational parameters, are due for maintenance or replacement, or a combination thereof. FIG. 1 also shows the proxy 130 coupled via a fourth data adapter 148 to the service interface 152. The service interface 152 is configured to access metrology data from multiple metrology devices. The service interface 152 is coupled, via the IT business logic 154, to the factory level system(s) 162. For example, the IT business logic 154 is configured to send commands to the factory level system(s) 162 based on the metrology data received from the service interface 152.

The first MD data adapter 122 is configured to receive first metrology data 103 (e.g., coordinates) from the first MD 102 and to convert the first metrology data 103 to first converted metrology data 123 having the common format. The second MD data adapter 124 is configured to receive second metrology data 105 (e.g., load measurements) from the second MD 104 (e.g., a load sensor) and to convert the second metrology data 105 to second converted metrology data 125 having the common format. In some implementations, the first MD data adapter 122, the second MD data adapter 124, or both, include software. For example, the metrology interface device 120, in response to detecting the first MD 102 corresponding to a particular device type, instantiates the first MD data adapter 122 corresponding to the particular device type from a software library. In a particular implementation, the software library includes a first MD data adapter class corresponding to the particular device type and the metrology interface device 120 instantiates an object (e.g., the first MD data adapter 122) of the first MD data adapter class. The first MD data adapter 122 is configured to communicate with the first MD 102.

The metrology interface device 120 includes one or more ports (e.g., network communication ports). For example, in FIG. 1, the metrology interface device 120 includes a topics port 132 and the data port 134. The proxy 130 is configured to output the converted metrology data as a data stream via the data port 134 (e.g., a network port) of the metrology interface device 120. For example, the proxy 130 is configured to output, via the data port 134, a data stream that includes the first converted metrology data 123, the second converted metrology data 125, or both.

Portions of the converted metrology data are identified in the data stream using corresponding topic names, which may be indicated in data tags, headers, or other data identifiers. For example, the first converted metrology data 123 is identified in the data stream using a first topic name 133. The topic names for a particular set of converted metrology data can be assigned (for example) by the MD that generates the metrology data, by the MD data adapter that converts the metrology data to converted metrology data, or by the proxy. As a particular example, the first MD 102 can include a job queue (not shown) indicating specific jobs (e.g., measurement tasks) to be performed by the first MD 102. In this particular example, each job is associated with a job number, and the job results in a set of metrology data. The job number, text descriptive of a measurement task associated with the job, or other information descriptive of the job or the measurement task can be output as a first topic name 133 associated with first metrology data 103 resulting from the job. In some implementations, the manufacturing system 164 can send a trigger message including an identifier of a job to a MD, such as the first MD 102 (as further described with reference to FIG. 2). In such implementations, the first MD 102, responsive to the trigger message, generates the first metrology data 103 and associates the first metrology data 103 with the first topic name 133, and the first topic name 133 includes information indicating that the first metrology data 103 is responsive to the trigger message. For example, the first topic name 133 can include the identifier of the job indicated in the trigger message. In this example, associating the first metrology data 103 with the first topic name 133 indicates that the first metrology data 103 is generated responsive to the trigger message corresponding to the first topic name 133. The first MD 102 provides the first metrology data 103 to the metrology interface device 120. For example, the first MD 102 generates a first file including the first topic name 133, and the first metrology data 103 and provides the first file having a first format to the metrology interface device 120. The first MD data adapter 122 generates the first converted metrology data 123 based on the first metrology data 103 and, in response to determining that the first metrology data 103 is associated with the first topic name 133, associates the first converted metrology data 123 with the first topic name 133. As another example, the second converted metrology data 125 is associated with a second topic name 135. To illustrate, the second MD data adapter 124 generates the second converted metrology data 125 associated with the second topic name 135.

The proxy 130 is configured to output, via the topics port 132, topic names 121 (e.g., a list of the topic names 121) corresponding to converted metrology data that is accessible via the data port 134. For example, the topic names 121 include the first topic name 133, the second topic name 135, or both.

Each of the first data adapter 142, the second data adapter 144, the third data adapter 146, and the fourth data adapter 148 is configured to access corresponding converted metrology data in the common format via the data port 134. The first data adapter 142, the second data adapter 144, the third data adapter 146, the fourth data adapter 148, or a combination thereof, are metrology device agnostic. For example, the first data adapter 142, the second data adapter 144, the third data adapter 146, the fourth data adapter 148, or a combination thereof, can process the converted metrology data (e.g., coordinates, load measurements, etc.) in the common format without having to be able to process data in a format specific to a particular metrology device. The first data adapter 142 is configured to access, via the data port 134, the first converted metrology data 123, the second converted metrology data 125, or both. As another example, the second data adapter 144 is configured to access, via the data port 134, the first converted metrology data 123, the second converted metrology data 125, or both.

The first data adapter 142, the second data adapter 144, the third data adapter 146, the fourth data adapter 148, or a combination thereof (e.g., subscriber devices) are configured to convert metrology data from the common format to a format supported by a corresponding manufacturing system. For example, the first data adapter 142 is configured to convert metrology data from the common format to a first format supported by the manufacturing system 164. As another example, the second data adapter 144 is configured to convert metrology data from the common format to a second format supported by the metrology database 156. The first data adapter 142, the second data adapter 144, the third data adapter 146, the fourth data adapter 148, or a combination thereof include hardware, software, or both.

During operation, the first MD 102 generates the first metrology data 103 corresponding to the first topic name 133. Metrology data can include, for example, laser tracker data, photogrammetry data, load measurement data, video data, temperature measurement data, flow measurement data, vibration measurement data, acoustic data, pressure measurement data, imaging data, distance measurement data, strain measurement data, other type of metrology data, or a combination thereof. In a particular example, the first MD 102 generates the imaging data based on sensor data from one or more image sensors, such as a visible light sensor, an infrared (IR) sensor, an ultraviolet (UV) sensor, an x-ray sensor, another type of image sensor, or a combination thereof. In a particular example, the first MD 102 generates the distance measurement data based on sensor data received from one or more distance sensors, such as a caliper, a linear variable differential transformer (LVDT) sensor, a time-of-flight laser, an interferometer, another type of distance sensor, or a combination thereof. The first metrology data 103 is based on, for example, a first file format, first units of measurement, a first coordinate system, a first point of reference, a first data template, or a combination thereof.

As a specific example, the first MD 102 can include a laser tracker and one or more laser tracker targets (e.g., spherically mounted retroreflectors (SMRs)) are located (e.g., mounted) on an aircraft part. In this example, the first MD 102 transmits one or more laser beams that are reflected by the SMRs and generates the first metrology data 103 based on reflections from the SMRs. The first MD 102 calculates first coordinates of a first target (e.g., a first SMR) based on a reflection of the laser beam(s) from the first target, second coordinates of a second target (e.g., a second SMR) based on a reflection of the laser beam(s) from the second target, or both.

Continuing the example above, the first MD 102 generates the first metrology data 103 indicating the first coordinates of the first SMR, the second coordinates of the second SMR, and so on. The first metrology data 103 has the first format. For example, the first metrology data 103 corresponds to the first coordinate system. To illustrate, the first metrology data 103 indicates the first coordinates, the second coordinates, or both, based on the first coordinate system (e.g., Cartesian coordinates or polar coordinates). In a particular aspect, the first coordinates indicate a first location of the first target (e.g., the first SMR) in three-dimensional (3D) space (e.g., a 3D coordinate system), and the second coordinates indicate a second location of the second target (e.g., the second SMR) in the 3D space. In this example, the first metrology data 103 includes measurements relative to a first point of reference. To illustrate, the first point of reference corresponds to a particular location in the 3D space, and the first metrology data 103 indicates the first coordinates relative to the first point of reference.

In a particular example, the first metrology data 103 corresponds to the first file format. To illustrate, the first MD 102 generates a first file based on the first coordinates, the second coordinates, or both. The first file has the first file format (e.g., a text format, a CSV format, a binary file format, or the ply file format), as further described with reference to FIG. 4. In a particular example, the first metrology data 103 corresponds to first units of measurement. For example, the first coordinates, the second coordinates, or both, are indicated in the first units of measurement (e.g., millimeters, centimeters, inches, or feet).

In a particular example, the first metrology data 103 corresponds to the first data template. To illustrate, the first data template indicates an order of data, particular data identifiers, or a combination thereof. The first MD 102 generates the first metrology data 103 as a first file indicating the first coordinates prior to the second coordinates corresponding to the order of data indicated by the first data template. In a particular example, the first data template includes a first keyword (e.g., "First Vertex:") as a first data identifier associated with the first target and a second keyword (e.g., "Second Vertex:") as a second data identifier associated with the second target. In this example, the first file includes the first keyword proximate to (e.g., next to) the first coordinates and the second keyword proximate to (e.g., next to) the second coordinates.

The first MD 102 provides the first metrology data 103 and the first topic name 133 to the metrology interface device 120. In a particular aspect, the first MD 102 registers with the metrology interface device 120 prior to providing the first metrology data 103 to the metrology interface device 120, as further described with reference to FIG. 2. In a particular aspect, the first MD 102 provides the first metrology data 103 to the metrology interface device 120 responsive to a trigger message generated by the manufacturing system 164, as further described with reference to FIG. 2. In a particular aspect, the trigger message indicates the first topic name 133.

The second MD 104 generates the second metrology data 105 corresponding to the second topic name 135. For example, the second MD 104 generates the second metrology data 105 corresponding to one or more sensors. In a specific example, the one or more sensors include a load cell coupled to an aircraft part. In this example, the second MD 104 generates the second metrology data 105 based on measurements (e.g., load measurements) received from the load cell. The second metrology data 105 has a second format. The second format includes, for example, a second file format, second units of measurement, a second coordinate system, a second point of reference, a second data template, or a combination thereof. The second MD 104 provides the second metrology data 105 and the second topic name 135 to the metrology interface device 120.

The first MD data adapter 122 receives the first metrology data 103 and the first topic name 133 from the first MD 102. In a particular aspect, the metrology interface device 120 provides the first metrology data 103 to the first MD data adapter 122 in response to determining that the first metrology data 103 is received from the first MD 102 and that the first MD 102 is associated with the first MD data adapter 122. In a particular implementation, the metrology interface device 120 determines that the first MD 102 is associated with the first MD data adapter 122 in response to determining that data stored in memory indicates that the first MD data adapter 122 is associated with the first MD 102. In a particular implementation, the metrology interface device 120 determines that the first MD 102 is associated with the first MD data adapter 122 in response to determining that the first MD 102 is of a first device type (e.g., a laser tracker device type) and that the first MD data adapter 122 is associated with the first device type. In this implementation, the metrology interface device 120 converts the first metrology data 103 to the first converted metrology data 123 based on the first device type of the first MD 102 by selecting the first MD data adapter 122 associated with the first device type and providing the first metrology data 103 to the first MD data adapter 122.

In a particular implementation, the first MD data adapter 122, in response to receiving the first metrology data 103, performs (for example) downsampling, smoothing, error trapping, data analysis, or a combination thereof. In a particular example, the first MD data adapter 122 receives the first metrology data 103 from the first MD 102 at a first frequency (e.g., once every 100 milliseconds) and generates the first converted metrology data 123 at a second frequency (e.g., once every 500 milliseconds). In a particular implementation, the first MD data adapter 122 generates the first converted metrology data 123 for every nth (e.g., 5th) instance of the first metrology data 103 received from the first MD 102. In this implementation, the first converted metrology data 123 can correspond to the most recently received nth instance of the first metrology data 103, to the most recently received n instances of the first metrology data 103 (e.g., average values), or a combination thereof. The first MD data adapter 122 provides the first converted metrology data 123 and the first topic name 133 to the proxy 130.

In a particular example, the first MD data adapter 122, in response to determining that the first metrology data 103 indicates an error, refrains from generating the first converted metrology data 123. To illustrate, the first MD data adapter 122 can determine that an error is detected in response to determining that the first coordinates, the second coordinates, or both, fail to satisfy a validation criterion associated with the first MD 102. The validation criterion can indicate valid ranges of coordinates, and the first MD data adapter 122 determines that an error is detected in response to determining that at least one of the first coordinates has an invalid value (e.g., outside a corresponding valid range). A technical effect of generating fewer instances (e.g., by downsampling, error trapping, etc.) of the first converted metrology data 123 includes a reduction in resource usage, such as a lower memory footprint in the metrology database 156, the maintenance health database 158, or both, a lower communication overhead associated with communicating the fewer instances of the first converted metrology data 123 to the proxy 130 and via the data port 134, reduced processing cycles of the first MD data adapter 122 to generate the fewer instances of the first converted metrology data 123, or a combination thereof.

The second MD data adapter 124 receives the second metrology data 105 and the second topic name 135 from the second MD 104. The second MD data adapter 124 generates the second converted metrology data 125 based on the second metrology data 105. For example, the second MD data adapter 124 can generate the second converted metrology data 125 by converting the second metrology data 105 in the second format to the second converted metrology data 125 having the common format. In a particular implementation, the second MD data adapter 124, in response to receiving the second metrology data 105, performs (for example) downsampling, smoothing, error trapping, data analysis, or a combination thereof. The second MD data adapter 124 provides the second converted metrology data 125 and the second topic name 135 to the proxy 130. In a particular example, the second MD data adapter 124, in response to determining that the second metrology data 105 indicates an error, refrains from generating the second converted metrology data 125.

The proxy 130, in response to receiving the first topic name 133 and the first converted metrology data 123, enables the first topic name 133 and the first converted metrology data 123 to be accessible via the data port 134. For example, the proxy 130 outputs a data stream 131 via the data port 134. In response to receiving the first topic name 133 and the first converted metrology data 123, the proxy 130 adds the first topic name 133 and the first converted metrology data 123 to the data stream 131. In a particular aspect, the proxy 130 adds first metadata corresponding to the first converted metrology data 123 to the data stream 131. The first metadata is generated by the first MD 102, the first MD data adapter 122, the proxy 130, or a combination thereof. For example, the first MD data adapter 122 receives the first metrology data 103 at a first time from the first MD 102 and generates (or updates) the first metadata to indicate the first time as a measurement time approximately at which the first metrology data 103 was generated (or measured). The first MD data adapter 122 generates analysis data corresponding to the first converted metrology data 123. For example, the analysis data indicates at least one of a measurement uncertainty, a sampling rate, or other attribute of the first converted metrology data 123. The first MD data adapter 122 updates the first metadata to indicate the analysis data. The proxy 130 receives the first metadata corresponding to the first converted metrology data 123 from the first MD data adapter 122. In a particular aspect, the first MD 102, the first MD data adapter 122, the proxy 130, or a combination thereof, update the first metadata to indicate sensor data generated by a sensor concurrently with the first MD 102 generating the first metrology data 103. For example, the sensor data includes a temperature measurement, a humidity measurement, a time measurement, other sensor data, or a combination thereof. The proxy 130 adds the first metadata to the data stream 131. Similarly, in response to receiving the second topic name 135 and the second converted metrology data 125, the proxy 130 adds the second topic name 135 and the second converted metrology data 125 to the data stream 131. In a particular aspect, the proxy 130 adds second metadata corresponding to the second converted metrology data 125 to the data stream 131.

In a particular implementation, the proxy 130 cycles through the content of the data stream 131 so that the first data adapter 142, the second data adapter 144, the third data adapter 146, the fourth data adapter 148, or a combination thereof can extract corresponding metrology data from the data stream 131 the next time that the corresponding metrology data is output via the data port 134. For example, the proxy 130 stores the first topic name 133 and the first converted metrology data 123 followed by the second topic name 135 and the second converted metrology data 123 in a circular buffer and outputs the content of the circular buffer via the data port 134. In this example, the proxy 130 removes (or overwrites) content in the circular buffer as converted metrology data is generated. To illustrate, the circular buffer has allocated spots corresponding to the first MD data adapter 122, the second MD data adapter 124, or both. The proxy 130 generates the first converted metrology data 123 and stores the first converted metrology data 123 in a first spot corresponding to the first MD data adapter 122. In a particular aspect, the proxy 130 overwrites a first instance of the first converted metrology data 123 stored in the first spot by storing a second instance of the first converted metrology data 123 in the first spot. It should be understood that a single spot corresponding to a MD data adapter is described as an illustrative example, in another implementation multiple spots are assigned to the MD data adapter. For example, multiple spots in the buffer are assigned to the first MD data adapter 122 and various replacement policies (e.g., first in first out (FIFO)) can be used to replace instances of the first converted metrology data 123 in the buffer. It should be understood that a circular buffer is described as an illustrative example, in other implementations, the proxy 130 uses other data structures to store converted metrology data.

The proxy 130 enables the topic names 121 indicating the first topic name 133, the second topic name 135, or both, to be accessible via the topics port 132 of the metrology interface device 120. In a particular implementation, the proxy 130 stores the topic names 121 in a memory register of the metrology interface device 120 and the memory register is readable via the topics port 132.

The first data adapter 142, the second data adapter 144, the third data adapter 146, the fourth data adapter 148, or a combination thereof access the topic names 121 via the topics port 132 to determine whether corresponding converted metrology data is available at the data port 134. For example, the first data adapter 142 receives the topic names 121 via the topics port 132 and determines whether the topic names 121 include the first topic name 133 associated with the manufacturing system 164. The first data adapter 142, in response to determining that the topic names 121 include the first topic name 133, monitors the data stream 131 via the data port 134 for metrology data corresponding to the first topic name 133. The first data adapter 142 extracts the first converted metrology data 123, the first metadata, or both, from the data stream 131 in response to determining that the first converted metrology data 123 corresponds to the first topic name 133. In a particular aspect, the first converted metrology data 123 includes the second file having the common file format (e.g., a ply format). The second file includes the first topic name 133 as a header of the second file. In a particular aspect, the second file includes the first converted coordinates and the second converted coordinates in a body of the second file.

In a particular aspect, the first data adapter 142 extracts metrology data from multiple metrology devices. In a particular example, the manufacturing system 164 is associated with the first topic name 133 and the second topic name 135. In this example, the first data adapter 142 extracts the first converted metrology data 123, the first metadata, or both, from the data stream 131 in response to determining that the first converted metrology data 123 corresponds to the first topic name 133 and extracts the second converted metrology data 125, the second metadata, or both, from the data stream 131 in response to determining that the second converted metrology data 125 corresponds to the second topic name 135.

The first data adapter 142 generates third data 143 based on the first converted metrology data 123, the first metadata, or both. For example, the third data 143 has a third format. The third format includes, for example, a third file format, third units of measurement, a third coordinate system, a third point of reference, a third data template, or a combination thereof. For example, the first data adapter 142 converts the second file having the common file format to a third file having the third file format (e.g., a binary file format, a text format, a CSV format, a ply format, a particular order of data elements, particular keywords, or a combination thereof). The third data 143 includes the third file. In a particular example, the first data adapter 142 generates the third data 143 by converting the first converted metrology data 123 (e.g., the first converted coordinates and the second converted coordinates) corresponding to the common coordinate system to the third data 143 (e.g., first particular converted coordinates and second particular converted coordinates) corresponding to the third coordinate system. In a particular example, the first data adapter 142 generates the third data 143 by converting the first converted metrology data 123 (e.g., the first converted coordinates and the second converted coordinates) corresponding to the common units of measurement to the third data 143 (e.g., the first particular converted coordinates and the second particular converted coordinates) corresponding to the third units of measurement. In a particular example, the first data adapter 142 generates the third data 143 by converting the first converted metrology data 123 (e.g., the first converted coordinates and the second converted coordinates) corresponding to the common point of reference to the third data 143 (e.g., the first particular converted coordinates and the second particular converted coordinates) corresponding to the third point of reference. In a particular example, the first data adapter 142 generates the third data 143 by converting the first converted metrology data 123 corresponding to the common data template to the third data 143 corresponding to the third data template. The third format is supported by the manufacturing system 164. In a particular aspect, the manufacturing system 164 supports the common format and the third data 143 has the common format. In this aspect, the third data 143 is a copy of the first converted metrology data 123. In a particular aspect, the first data adapter 142 updates the first metadata to have the third format.

In a particular aspect, in response to receiving the first converted metrology data 123, the first data adapter 142 performs (for example) downsampling, smoothing, error trapping, data analysis, or a combination thereof. The first data adapter 142 provides the third data 143, the first metadata, or both, to the manufacturing system 164.

In a particular example, the first data adapter 142 generates at least a portion of the third data 143 based on the second converted metrology data 125, the second metadata, or both. For example, the first data adapter 142 generates the portion of the third data 143 by converting the second converted metrology data 125 having the common format to the portion of the third data 143 having the third format. In a particular aspect, the portion of the third data 143 indicates a first particular measurement corresponding to the third units of measurement, the third coordinate system, the third point of reference, the third data template, or a combination thereof. In a particular aspect, the third format includes, for example, multiple units of measurement, multiple coordinate systems, multiple points of reference, multiple data templates, or a combination thereof. For example, the third format includes a first particular unit of measurement for distance measurements and a second particular unit of measurement for weight measurements. In a particular implementation, the third data 143 indicates the first particular converted coordinates corresponding to the first particular unit of measurement and indicates the first particular measurement (e.g., a load measurement) corresponding to the second particular unit of measurement. In a particular implementation, the first data adapter 142 provides a first portion of the third data 143 to the manufacturing system 164 in response to extracting the first converted metrology data 123 and provides a second portion of the third data 143 to the manufacturing system 164 in response to extracting the second converted metrology data 125 from the data stream 131. In a particular aspect, the first data adapter 142 updates the second metadata to have the third format. In a particular aspect, the first data adapter 142 provides the first portion of the third data 143 with the first metadata to the manufacturing system 164 and provides the second portion of the third data 143 with the second metadata to the manufacturing system 164.

In a particular example, in response to determining that the first converted metrology data 123 indicates an error, the first data adapter 142 refrains from generating the third data 143. To illustrate, the first data adapter 142 determines that the first converted metrology data 123 indicates a first measurement (e.g., the first converted coordinates), a second measurement (e.g., the second converted coordinates), or both. The first data adapter 142 determines that an error is detected in response to determining that the first measurement (e.g., the first converted coordinates), the second measurement (e.g., the second converted coordinates), or both, fail to satisfy a validation criterion associated with the manufacturing system 164. For example, the validation criterion may indicate valid ranges of measurements, and the first data adapter 142 determines that an error is detected in response to determining that at least a portion of the first measurement, the second measurement, or both, has an invalid value (e.g., outside a corresponding valid range). A technical effect of generating (e.g., by downsampling, error trapping, etc.) fewer instances of the third data 143 includes a reduction in resource usage, such as a lower memory footprint for storing the fewer instances of the third data 143, a lower communication overhead associated with communicating the fewer instances of the third data 143 to the manufacturing system 164, reduced processing cycles of the first data adapter 142 to generate the fewer instances of the third data 143, reduced processing cycles of the manufacturing system 164 to process the fewer instances of the third data 143, or a combination thereof.

The manufacturing system 164 performs various operations in response to receiving at least a portion of the third data 143. For example, the manufacturing system 164 generates (or updates) a graphical user interface (GUI) based on the third data 143 (or the portion of the third data 143) and provides the GUI to a display. As another example, the manufacturing system 164 compares the third data 143 (or a portion thereof) to a specification for a part or assembly on which the manufacturing system 164 is operating. The manufacturing system 164 determines whether a condition is detected based on a comparison of the third data 143 (or a portion thereof) to the specification. For example, the manufacturing system 164 determines that the third data 143 indicates a first measurement (e.g., first converted coordinates), a second measurement (e.g., the second converted coordinates), a third measurement (e.g., a first load measurement), a fourth measurement (e.g., a second load measurement), or a combination thereof, and the manufacturing system 164 detects the condition in response to determining that at least one of the first measurement, the second measurement, the third measurement, the fourth measurement, or a combination thereof, does not satisfy (e.g., does not match) the specification. To illustrate, the manufacturing system 164 detects the condition in response to determining that the first converted coordinates, the second converted coordinates, or both, do not match particular coordinates indicated by the specification. As an illustrative example, the manufacturing system 164 determines that the third data 143 indicates that the aircraft part is positioned lower in the 3D space (e.g., y-coordinates are lower) than indicated by the specification. In addition or in the alternative, the manufacturing system 164 can detect the condition in response to determining that the first load measurement, the second load measurement, or both, do not match particular load measurements indicated by the specification. As an illustrative example, the manufacturing system 164 detects the condition in response to determining that the third data 143 indicates that the aircraft part is positioned lower in the 3D space (e.g., y-coordinates are lower) than indicated by the specification, that the third data 143 indicates a higher than threshold difference between the first load measurement and the second load measurement, or both.

In a particular aspect, the manufacturing system 164 compares the first portion of the third data 143 to a first specification (e.g., a coordinate specification) and compares the second portion of the third data 143 to a second specification (e.g., a load specification). The manufacturing system 164 detects the condition based on the comparison of the first portion of the third data 143 to the first specification, the comparison of the second portion of the third data 143 to the second specification, or both.

The manufacturing system 164 sends a command 165 to the manufacturing device 166 based on the condition. For example, the command 165 indicates that manufacturing device 166 (e.g., a robotic arm) is to move the aircraft part in a particular direction (e.g., higher along a y-axis in the 3D space).

In a particular implementation, the manufacturing system 164 detects a particular condition associated with the manufacturing operation based on the third data 143 and generates a trigger message in response to detecting the particular condition. For example, the manufacturing system 164 sends a first trigger message to the first data adapter 142, e.g., in response to receiving a user input. The first MD 102 generates the first metrology data 103 responsive to the first trigger message. The metrology interface device 120 outputs the first converted metrology data 123 via the data stream 131. The first data adapter 142 extracts the first converted metrology data 123 from the data stream 131 and generates the third data 143.

The manufacturing system 164 detects a particular condition based on the third data 143. For example, the specification indicates that particular measurement data (e.g., load measurement data) is to be analyzed when the particular condition (e.g., the aircraft part has particular coordinates) is detected. In an illustrative example, the manufacturing system 164 determines that the particular condition is detected in response to determining that the first coordinates, the second coordinates, or both, match the particular coordinates indicated by the specification. The manufacturing system 164 determines that the second MD data adapter 124 corresponds to a data type of the particular measurement data (e.g., load measurement data), a particular type of device that generates the particular measurement data, or both. The manufacturing system 164 sends a second trigger message to the second data adapter 144. The second MD 104 generates the second metrology data 105 responsive to the second trigger message. The metrology interface device 120 outputs the second converted metrology data 125 via the data stream 131. The first data adapter 142 extracts the second converted metrology data 125 from the data stream 131. The first data adapter 142 generates the third data 143 based on the second converted metrology data 125. The manufacturing system 164 performs an analysis of the first measurement (e.g., the first load measurement), the second measurement (e.g., the second load measurement), or both, indicated by the third data 143. For example, the manufacturing system 164 determines whether an error is detected based on a comparison of the third data 143 to a specification. In a particular aspect, the manufacturing system 164 generates an error indication in response to determining that the first measurement, the second measurement, or both, do not match the specification. The manufacturing system 164 sends the command 165 to the manufacturing device 166 based on the error indication. For example, the command 165 indicates that the aircraft part is to be tilted at a particular angle to distribute the load more evenly.

The second data adapter 144, the third data adapter 146, the fourth data adapter 148, or a combination thereof, extract converted metrology data from the data stream 131. For example, the second data adapter 144 extracts the first converted metrology data 123, the second converted metrology data 125, or both, from the data stream 131. The second data adapter 144 generates fourth data 145 based on the first converted metrology data 123, the second converted metrology data 125, or both. For example, the fourth data 145 has a format supported by the metrology database 156. The second data adapter 144 provides the fourth data 145 to the metrology database 156. The metrology database 156 stores at least a portion of the fourth data 145. The metrology database 156 maintains a record of converted metrology data generated by the metrology interface device 120.

The third data adapter 146 extracts the first converted metrology data 123, the second converted metrology data 125, or both, from the data stream 131. The third data adapter 146 generates fifth data 147 based on the first converted metrology data 123, the second converted metrology data 125, or both. For example, the fifth data 147 has a format supported by the maintenance health database 158. The third data adapter 146 provides the fifth data 147 to the maintenance health database 158. The maintenance health database 158 stores at least a portion of the fifth data 147. In a particular aspect, the maintenance health database 158 stores data indicating whether a particular metrology device is performing within particular operational parameters, is due for maintenance or replacement, or a combination thereof. In an illustrative example, the second converted metrology data 125 indicates the second MD 104 that generated the second metrology data 105. In a particular, aspect, the second MD data adapter 124 generates assessment data based on determining whether the first measurement, the second measurement, or both, are within threshold parameters associated with the second MD 104. The assessment data indicates whether the first measurement, the second measurement, or both, are within the threshold parameters. The second MD data adapter 124 provides the assessment data to the third data adapter 146. In a particular aspect, second metadata associated with the second converted metrology data 125 includes the assessment data. The second MD data adapter 124 provides the second metadata to the proxy 130 and the proxy 130 adds the second metadata corresponding to the second converted metrology data 125 to the data stream 131. The third data adapter 146 extracts the second converted metrology data 125 and the second metadata (including the assessment data) from the data stream 131 and stores the second converted metrology data 125, the second metadata, the assessment data, or a combination thereof, in the maintenance health database 158. In a particular aspect, the assessment data indicates that the second MD 104 is due for maintenance or replacement by indicating that the first measurement, the second measurement, or both, are not within the threshold parameters associated with the second MD 104.

The fourth data adapter 148 extracts the first converted metrology data 123, the second converted metrology data 125, or both, from the data stream 131. The fourth data adapter 148 generates sixth data 149 based on the first converted metrology data 123, the second converted metrology data 125, or both. For example, the sixth data 149 has a format supported by the service interface 152. The fourth data adapter 148 provides the sixth data 149 to the service interface 152. The service interface 152 generates service data 153 based on the sixth data 149. The service interface 152 provides the service data 153 to the IT business logic 154. The IT business logic 154 performs an analysis of the service data 153, first data accessed from the metrology database 156, second data accessed from the maintenance health database 158, or a combination thereof. The IT business logic 154 sends one or more commands to the factory level system(s) 162. For example, the IT business logic 154 sends a command 155 to the factory level system(s) 162.

One or more additional manufacturing systems can be added to the system 100 without changing the metrology interface device 120 because the metrology interface device 120 is manufacturing system agnostic. For example, an additional manufacturing system can access the data stream 131 and extract corresponding metrology data without changes to the metrology interface device 120. A metrology device can be added to the system 100 without changes to the manufacturing systems because the manufacturing systems are metrology device agnostic. For example, the first MD 102 can be replaced with a third MD 502, as further described with reference to FIG. 5 without changes to the manufacturing system 164. When a metrology device is changed or added, the system 100 can be qualified without a complete functional revalidation of the entire system 100. The system 100 reduces overall resource utilization. In a particular example, a communication overhead is reduced by providing a single data stream to each of the data adapters associated with manufacturing systems as compared to providing particular metrology data individually to particular manufacturing systems.

Figure 2:
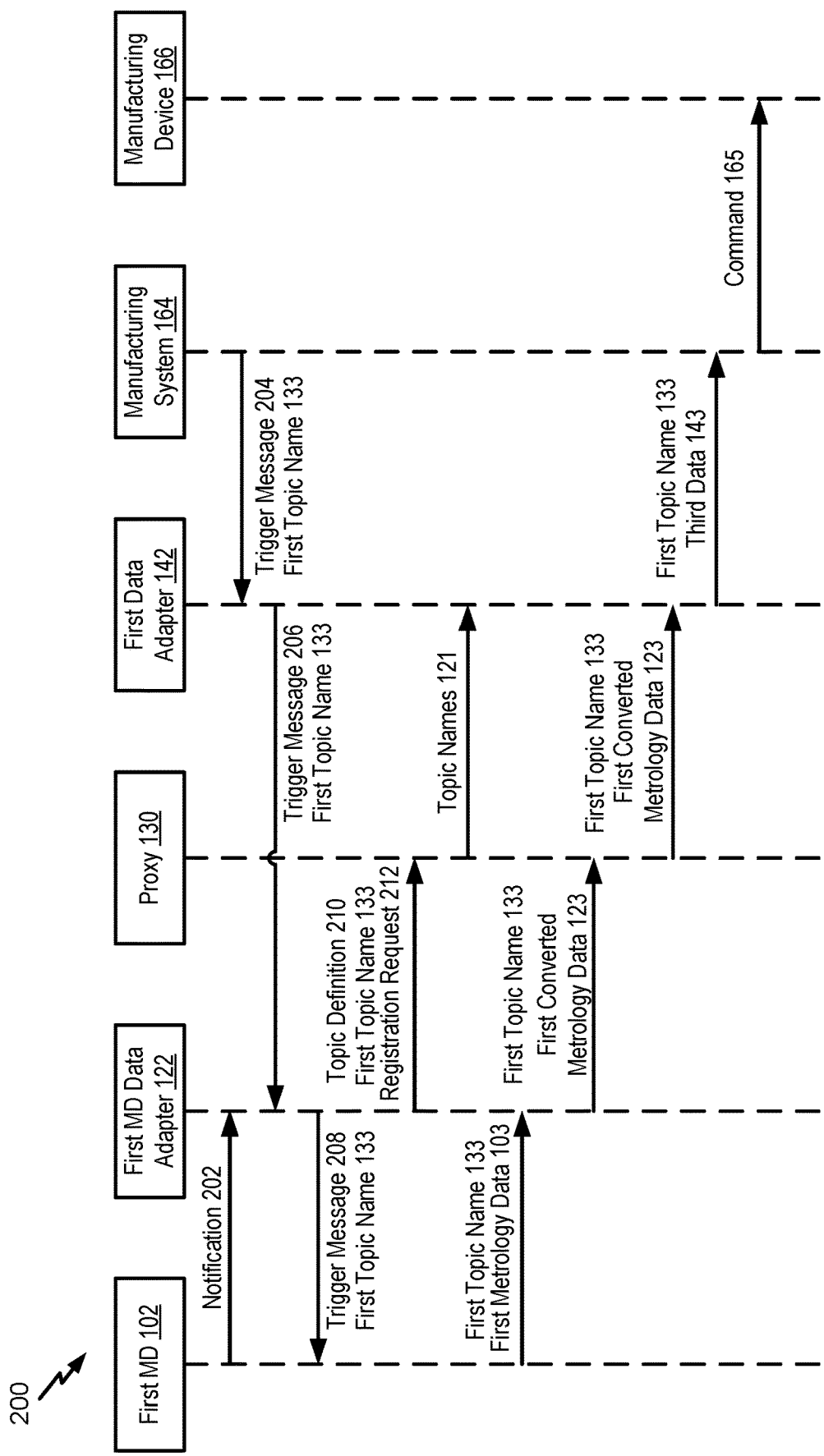
FIG. 2 is a ladder diagram corresponding to operation of a particular aspect of the system of FIG. 1.

Referring to FIG. 2, a diagram is shown and generally designated 200. The diagram 200 illustrates various operation of a particular aspect of the system 100 of FIG. 1. The timing and operations shown in FIG. 2 are for illustration and are not limiting. In other aspects, additional or fewer operations may be performed and the timing may be different.

In a particular aspect, the first MD 102 registers with the metrology interface device 120. For example, the first MD 102 sends a notification 202 to the first MD data adapter 122 in response to powering up, in response to receiving a user input, or both. The notification 202 includes an identifier of the first MD 102. In a particular aspect, the notification 202 also indicates that the first MD 102 is online (e.g., ready for generating metrology data). The first MD data adapter 122, in response to receiving the notification 202, establishes communication (e.g., a session) with the first MD 102.

In a particular implementation, the notification 202 indicates a device type of the first MD 102. In response to receiving the notification 202, the metrology interface device 120 identifies a MD data adapter class corresponding to the device type. To illustrate, the MD data adapter class is associated with a data type of metrology data that is generated by the first MD 102 (and other devices) of the device type. The metrology interface device 120 instantiates the first MD data adapter 122 as an object of the MD data adapter class. In this implementation, the metrology interface device 120 provides the identifier of the first MD 102 to the first MD data adapter 122, and the first MD data adapter 122 establishes communication (e.g., a session) with the first MD 102. In a particular aspect, the metrology interface device 120 maintains data indicating that the first MD data adapter 122 is associated with the first MD 102 (e.g., the identifier of the first MD 102), the device type, the data type, or a combination thereof.

In the example illustrated in FIG. 2, the manufacturing system 164 sends a trigger message 204 and the first topic name 133 to the first data adapter 142 in response to receiving a user input or in response to detection of an event indicating a need for metrology data from the first MD 102. In an illustrative example, at least a portion of the first topic name 133 (e.g., "LaserTracker_SetM1") corresponds to a particular device type of the first MD 102 (e.g., "laser tracker"). In a particular aspect, the trigger message 204 indicates the particular data type (e.g., a coordinate data type, a load measurement data type, or another data type), the particular device type (e.g., a laser tracker type, a load sensor type, or another device type), the identifier of the first MD 102, the identifier of the first MD data adapter 122, or a combination thereof. In some implementations, the first topic name 133 is independent of the first MD 102. The manufacturing system 164 sends the first topic name 133 and the trigger message 204 to the first data adapter 142.

The first data adapter 142 generates a trigger message 206 based on the trigger message 204. For example, the trigger message 206 indicates the particular data type (e.g., a coordinate data type, a load measurement data type, or another data type), the particular device type (e.g., a laser tracker type, a load sensor type, or another device type), the identifier of the first MD 102, the identifier of the first MD data adapter 122, or a combination thereof. The first data adapter 142 sends the trigger message 206 and the first topic name 133 (e.g., "LaserTracker_SetM1") to the first MD data adapter 122. As an illustrative example, the first data adapter 142 sends the trigger message 206 to the first MD data adapter 122 in response to determining that the trigger message 204 indicates the first MD data adapter 122. In a particular aspect, the trigger message 206 indicates the first topic name 133 (e.g., "LaserTracker_SetM1").

In a particular implementation, the first data adapter 142 sends the trigger message 206 and the first topic name 133 (e.g., "LaserTracker_SetM1") to another component of the metrology interface device 120, such as the proxy 130. The metrology interface device 120 determines that the trigger message 206 and the first topic name 133 (e.g., "LaserTracker_SetM1") are to be processed by the first MD data adapter 122. For example, in response to determining that the trigger message 206 indicates the first MD 102 (e.g., the laser tracker) and that the first MD data adapter 122 is associated with the first MD 102, the metrology interface device 120 determines that the trigger message 206 and the first topic name 133 (e.g., "LaserTracker_SetM1") are to be processed by the first MD data adapter 122. As another example, in response to determining that the trigger message 206 indicates the particular data type (e.g., coordinate data type), the particular device type (e.g., laser tracker type), or both, and that the first MD data adapter 122 is associated with the particular data type, the particular device type, or both, the metrology interface device 120 determines that the trigger message 206 and the first topic name 133 are to be processed by the first MD data adapter 122. The metrology interface device 120 provides the trigger message 206 and the first topic name 133 (e.g., "LaserTracker_SetM1") to the first MD data adapter 122.

The first MD data adapter 122, in response to receiving the trigger message 206 and the first topic name 133 (e.g., "LaserTracker_SetM1"), sends a trigger message 208 and the first topic name 133 to the first MD 102. Additionally, or alternatively, the first MD data adapter 122 generates a topic definition 210 corresponding to the first MD 102. The topic definition 210 indicates the first topic name 133 (e.g., "LaserTracker_SetM1") and a header, as further described with reference to FIG. 4. The header includes a description of data elements to be included in output generated by the first MD data adapter 122. For example, the header indicates a data element name (e.g., vertex), a count of data elements of the data element name (e.g., 5), various properties associated with the data element name (e.g., property x of type float, property y of type float, property z of type float), or a combination thereof, as further described with reference to FIG. 4. The header indicates a particular data format of the output generated by the first MD data adapter 122. For example, the header indicates that the data includes the count of lines corresponding to the count of data elements and that each line corresponding to a data element of the data element name indicates the properties associated with the data element name.

In the example illustrated in FIG. 2, the first MD data adapter 122 sends a registration request 212, the topic definition 210, the first topic name 133 (e.g., "LaserTracker_SetM1"), or a combination thereof, to the proxy 130. In response to receiving the registration request 212, the proxy 130 registers the first MD data adapter 122. In a particular implementation, registering the first MD data adapter 122 includes storing data in memory indicating that the first MD data adapter 122 is associated with the first MD 102 (e.g., the laser tracker), the topic definition 210, the first topic name 133 (e.g., "LaserTracker_SetM1"), or a combination thereof.

The proxy 130 generates (or updates) the topic names 121 to include the first topic name 133 (e.g., "LaserTracker_SetM1"). The proxy 130 enables access to the topic names 121 via the topics port 132 of FIG. 1 by the first data adapter 142. In a particular aspect, the first data adapter 142 monitors (e.g., periodically or at various time intervals) the topics port 132 subsequent to sending the trigger message 206 to check whether the topic names 121 include the first topic name 133. The first data adapter 142, in response to determining that the topic names 121 include the first topic name 133 (e.g., "LaserTracker_SetM1"), monitors the data port 134 for metrology data associated with the first topic name 133.

The first MD 102 generates the first metrology data 103 in response to receiving the trigger message 208. For example, a first reflector and a second reflector are mounted at different locations on an aircraft part (e.g., a pyramid-shaped part). The first MD 102 directs a laser beam at the reflectors and determines first coordinates (e.g., "0, 0, 0") of the first reflector and second coordinates (e.g., "1, 0, 0") of the second reflector based on reflection of the laser beam. The first metrology data 103 (e.g., "First Vertex: 0, 0, 0 Second Vertex: 1, 0, 0") indicates first measurements (e.g., "0, 0, 0"), second measurements (e.g., "1, 0, 0"), additional measurements, or a combination thereof. The first MD 102 determines that the first metrology data 103 is associated with the first topic name 133 (e.g., "LaserTracker_SetM1") in response to determining that the first metrology data 103 is generated in response to receiving the trigger message 208 associated with the first topic name 133.

The first MD 102 provides the first metrology data 103 and the first topic name 133 (e.g., "LaserTracker_SetM1") associated with the first metrology data 103 to the first MD data adapter 122. The first MD data adapter 122 generates the first converted metrology data 123 by converting the first metrology data 103 having a first format (e.g., a format supported by the first MD 102) to the first converted metrology data 123 having the common format. For example, the first MD data adapter 122 determines that the first metrology data 103 (e.g., "First Vertex: 0, 0, 0 Second Vertex: 1, 0, 0") indicates the first measurements (e.g., "0, 0, 0"), the second measurements (e.g., "1, 0, 0"), additional measurements, or a combination thereof.

The first MD data adapter 122 generates the first converted metrology data 123 indicating data elements based on the first measurements (e.g., "0, 0, 0"), the second measurements (e.g., "1, 0, 0"), the additional measurements, or a combination thereof, as further described with reference to FIG. 4. For example, the first converted metrology data 123 (e.g., "0 0 0 1 0 0") indicates a first data element (e.g., "0 0 0") corresponding to the first measurements (e.g., "0, 0, 0"), a second data element (e.g., "1 0 0") corresponding to the second measurements (e.g., "1, 0, 0"), additional data elements, or a combination thereof. The first converted metrology data 123 complies with the particular data format indicated in the topic definition 210.

The first MD data adapter 122 provides the first converted metrology data 123 (e.g., "0 0 0 1 0 0") and the first topic name 133 (e.g., "LaserTracker_SetM1") to the proxy 130. The proxy 130 provides the first converted metrology data 123 (e.g., "0 0 0 1 0 0") and the first topic name 133 (e.g., "LaserTracker_SetM1") to the first data adapter 142. For example, the first data adapter 142 accesses the first converted metrology data 123 (e.g., "0 0 0 1 0 0") via the data port 134 of FIG. 1 in response to determining that the first converted metrology data 123 is associated with the first topic name 133 (e.g., "LaserTracker_SetM1") that was received by the first data adapter 142 from the manufacturing system 164.

The first data adapter 142 generates the third data 143 (e.g., "First Vertex (0, 0, 0) Second Vertex (1, 0, 0)") having a second format based on the first converted metrology data 123 (e.g., "0 0 0 1 0 0") having the common format, as further described with reference to FIG. 4. For example, the third data 143 (e.g., "First Vertex (0, 0, 0) Second Vertex (1, 0, 0)") indicates the first measurements (e.g., "0, 0, 0"), the second measurements (e.g., "1, 0, 0"), additional measurements, or a combination thereof, in the second format that is supported by the manufacturing system 164. The first data adapter 142 provides the third data 143 (e.g., "First Vertex (0, 0, 0) Second Vertex (1, 0, 0)"), the first topic name 133 (e.g., "LaserTracker_SetM1"), or both, to the manufacturing system 164.

The manufacturing system 164 determines whether a condition is detected based on a comparison of the third data 143 (e.g., "First Vertex (0, 0, 0) Second Vertex (1, 0, 0)") to a specification. For example, the specification indicates valid (or target) measurement ranges. The manufacturing system 164 determines that a condition is detected in response to determining that the first measurement fails to satisfy a first measurement range indicated by the specification, that the second measurement fails to satisfy a second measurement range indicated by the specification, or both. The manufacturing system 164 generates a command 165 based on the condition. As an illustrative example, the manufacturing system 164 determines that a condition (e.g., low y-coordinates) is detected in response to determining that y-coordinates (e.g., "0") indicated by the first coordinates (e.g., "0, 0, 0") and the second coordinates (e.g., "1, 0, 0) are lower than target y-coordinates (e.g., "2") indicated by the specification. In a particular example, the manufacturing system 164 determines a particular distance based on a difference between the target y-coordinates (e.g., "2") and the y-coordinates (e.g., "0") indicated by the first coordinates and the second coordinates. The manufacturing system determines a particular direction (e.g., vertical) corresponding to the y-coordinates. The manufacturing system 164 generates the command 165 indicating that the aircraft part is to be moved the particular distance (e.g., 2) in the particular direction (e.g., vertical). It should be understood that the command 165 is described as indicating that the aircraft part is to be moved a particular distance in a particular direction as an illustrative example. In other examples, the command 165 indicates other movement of the aircraft part, cooling the aircraft part, heating the aircraft part, attaching another part to the aircraft part, applying a material to the aircraft part, cutting the aircraft part, another type of command, or a combination thereof. The manufacturing system 164 sends the command 165 to the manufacturing device 166 (e.g., a robotic arm). The manufacturing device 166 performs the command 165, e.g., moves the aircraft part the particular distance (e.g., 2) in the particular direction (e.g., vertical).

In a particular aspect, the first format of the first metrology data 103 includes, for example, a first file format, a first coordinate system, first units of measurement, a first point of reference, a first data template, or a combination thereof. The common format of the first converted metrology data 123 includes, for example, a common file format, a common coordinate system, common units of measurement, a common point of reference, a common data template, or a combination thereof. The second format of the third data 143 includes, for example, a second file format, a second coordinate system, second units of measurement, a second point of reference, a second data template, or a combination thereof.

Converting the first metrology data 103 from the first format to the first converted metrology data 123 having the common format includes, for example, converting from the first file format to the common file format, the first coordinate system to the common coordinate system, the first units of measurement to the common units of measurement, the first point of reference to the common point of reference, the first data template to the common data template, or a combination thereof. In a particular example, the first metrology data 103 (e.g., "First Vertex: 0, 0, 0 Second Vertex: 1, 0, 0") indicates first measurements (e.g., "0, 0, 0"), second measurements (e.g., "1, 0, 0"), additional measurements, or a combination thereof, in the first units of measurement (e.g., inches). The first MD data adapter 122 generates first converted measurements (e.g., "0, 0, 0") and second converted measurements (e.g., "2.54, 0, 0") by converting the first measurements (e.g., "0, 0, 0") and the second measurements (e.g., "1, 0, 0") from the first units of measurement (e.g., inches) to the common units of measurement (e.g., centimeters). The first MD data adapter 122 generates the first converted metrology data 123 (e.g., "0 0 0 2.54 0 0") indicating the first converted measurements (e.g., "0 0 0"), the second converted measurements (e.g., "2.54 0 0"), the additional measurements, or a combination thereof, in the common units of measurement (e.g., centimeters). In this example, the second format includes second units of measurement (e.g., millimeters). Converting the first converted metrology data 123 from the common format to the third data 143 having the second format includes adjusting the units of measurement. For example, the first data adapter 142 generates first particular converted measurements (e.g., "0, 0, 0") and second particular converted measurements (e.g., "2.54, 0, 0") by converting the first converted measurements and the second converted measurements from the common units of measurement (e.g., centimeters) to the second units of measurement (e.g., millimeters). The third data 143 (e.g., "0 0 0 25.4 0 0") indicates the first particular converted measurements (e.g., "0 0 0"), the second particular converted measurements (e.g., "25.4 0 0"), the additional measurements, or a combination thereof, in the second units of measurement (e.g., millimeters).

The first data adapter 142 is agnostic to the first MD 102. For example, the first data adapter 142 receives the first converted metrology data 123 in the common format and does not have to support the first format corresponding to the first MD 102. Various metrology devices may correspond to multiple formats. Converting the metrology data to a common format enables the first data adapter 142 to process metrology data generated by the various metrology devices without having to support the corresponding multiple formats.

Figure 3:
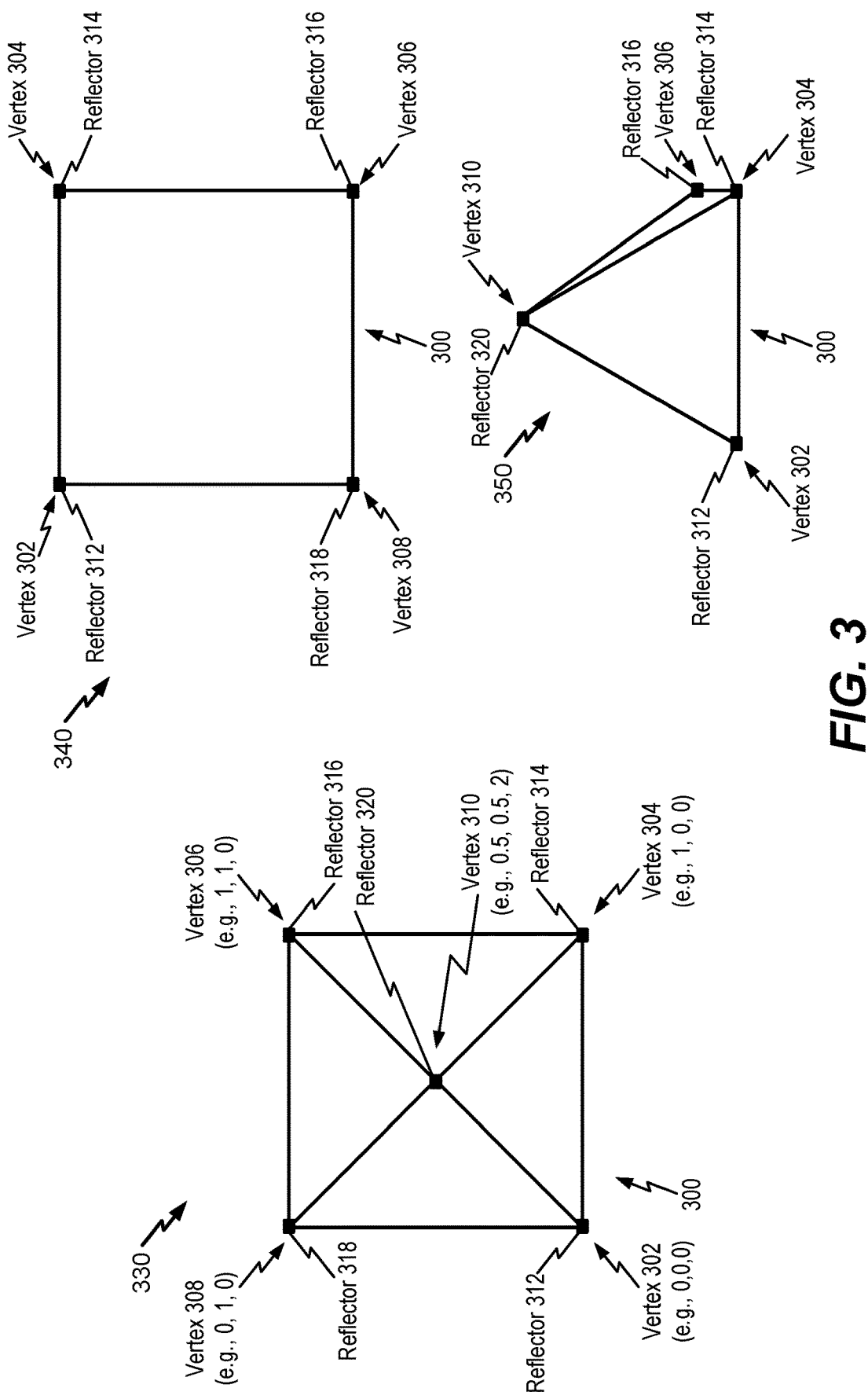
FIG. 3 is a diagram that illustrates multiple views of an example of an aircraft part tracked by a metrology device of the system of FIG. 1.

Referring to FIG. 3, a top view 330, a bottom view 340, and a lateral view 350 of an aircraft part 300 are shown. In FIG. 3, the aircraft part 300 has a pyramid shape. It should be understood that the pyramid shape of the aircraft part 300 is provided as an illustrative example. In other examples, the aircraft part 300 has other shapes.

The aircraft part 300 has a set of co-planar vertices. For example, the aircraft part 300 includes a vertex 302, a vertex 304, a vertex 306, and a vertex 308 that are co-planar. The vertices 302-308 correspond to corners of a rectangular (e.g., square) base of the pyramid shape. The aircraft part 300 has a vertex 310 that forms a peak of the pyramid shape.

One or more reflectors are attached to the aircraft part 300. For example, a reflector 312 (e.g., a first SMR), a reflector 314 (e.g., a second SMR), a reflector 316 (e.g., a third SMR), a reflector 318 (e.g., a fourth SMR), and a reflector 320 (e.g., a fifth SMR) are mounted on (or at a fixed distance from) the vertex 302, the vertex 304, the vertex 306, the vertex 308, and the vertex 310, respectively.

In a particular implementation, the first MD 102 of FIG. 1 directs one or more laser beams at the reflectors 312-320 and estimates locations (e.g., coordinates) of the vertices 302-310 based on reflections of the laser beams. For example, the first MD 102 determines, at a first time, that the vertex 302 has first coordinates (e.g., 0, 0, 0), that the vertex 304 has second coordinates (e.g., 1, 0, 0), that the vertex 306 has third coordinates (e.g., 1, 1, 0), that vertex 308 has fourth coordinates (e.g., 0, 1, 0), that vertex 310 has fifth coordinates (e.g., 0.5, 0.5, 2). The first MD 102 generates the first metrology data 103 indicating the coordinates corresponding to the vertices 302-310.

Figure 4:
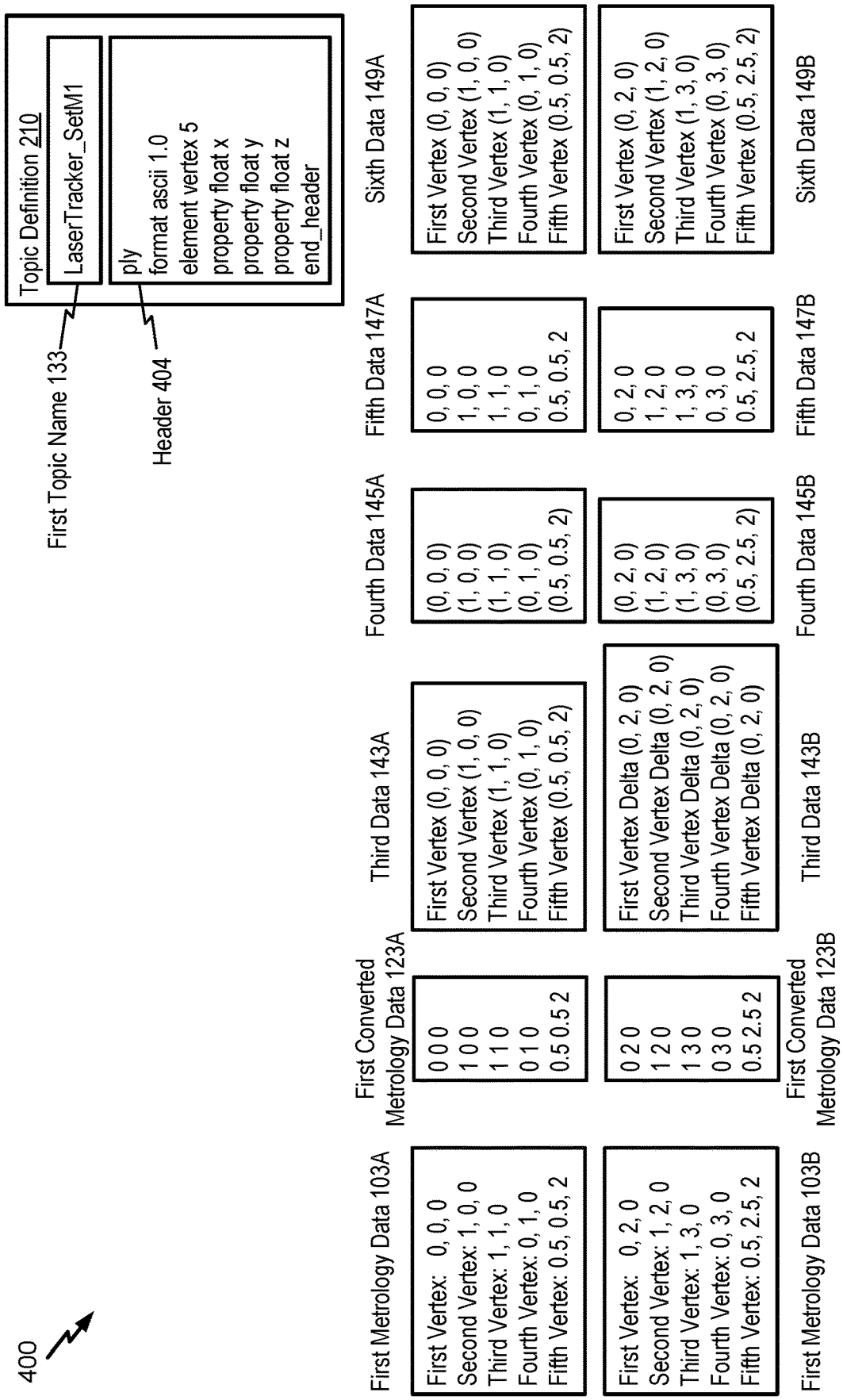
FIG. 4 is a diagram that illustrates examples of data generated by the system of FIG. 1.

Referring to FIG. 4, a diagram is shown and generally designated 400. The diagram 400 includes illustrative examples of data generated by the system 100 of FIG. 1. For example, the diagram 400 includes the topic definition 210. The topic definition 210 includes the first topic name 133 and a header 404. A first line ("ply") of the header 404 indicates that the data generated by the first MD data adapter 122 of FIG. 1 corresponds to the common file format (e.g., the ply file format). A second line ("format ascii 1.0") of the header 404 indicates that the data generated by the first MD data adapter 122 represents ASCII codes. In an alternate example, the second line (e.g., "format binary") indicates that the data generated by the first MD data adapter 122 represents binary.

The header 404 indicates a data format of metrology data that is associated with the first topic name 133. For example, a line of the header 404 beginning with a particular word (e.g., "element") describes one or more data elements included in data generated by the first MD data adapter 122. To illustrate, a third line (e.g., "element vertex 5") of the header 404 indicates that data generated by the first MD data adapter 122 includes a count (e.g., 5) of data elements having a data element name (e.g., "vertex"). A line of the header 404 beginning with a particular word (e.g., "property") describes a property of a data element having the data element name (e.g., "vertex"). For example, a fourth line (e.g., "property float x"), a fifth line (e.g., "property float y"), and a sixth line (e.g., "property float z") of the header 404 indicate that a data element (e.g., a vertex data element) includes a first property of a type (e.g., "float") having a first property name (e.g., "x"), a second property of the type having a second property name (e.g., "y"), and a third property of the type having a third property name (e.g., "z"), respectively. A line of the header 404 with a particular word (e.g., "end_header") indicates the end of the header 404. It should be understood that a particular type (e.g., "float") of property of a data element is described as an illustrative example. In other implementations, a property of a data element could be of any type, such as integer, character, unsigned character, a user-defined type, a list, or another type. It should be understood that a single data element type (e.g., "vertex") is described as an illustrative example. In other implementations, the header 404 can describe multiple data element types.

The diagram 400 also illustrates examples of first metrology data 103A, first converted metrology data 123A, third data 143A, fourth data 145A, fifth data 147A, sixth data 149A, first metrology data 103B, first converted metrology data 123B, third data 143B, fourth data 145B, fifth data 147B, and sixth data 149B. In a particular aspect, the first metrology data 103A and the first metrology data 103B correspond to a first example and a second example, respectively, of the first metrology data 103 of FIG. 1. The first converted metrology data 123A and the first converted metrology data 123B correspond to a first example and a second example, respectively, of the first converted metrology data 123 of FIG. 1. The third data 143A and the third data 143B correspond to a first example and a second example, respectively, of the third data 143 of FIG. 1. The fourth data 145A and the fourth data 145B correspond to a first example and a second example, respectively, of the fourth data 145 of FIG. 1. The fifth data 147A and the fifth data 147B correspond to a first example and a second example, respectively, of the fifth data 147 of FIG. 1. The sixth data 149A and the sixth data 149B correspond to a first example and a second example, respectively, of the sixth data 149 of FIG. 1.

In a particular example, the first metrology data 103A indicates coordinates, at a first time, of reflectors attached to the aircraft part 300 of FIG. 3, as described with reference to FIGS. 1-3. The first MD data adapter 122 generates the first converted metrology data 123A by converting the first metrology data 103A having a first format to the first converted metrology data 123A having the common format. The first converted metrology data 123A corresponds to the topic definition 210. For example, the first converted metrology data 123A includes the count (e.g., 5) of the data elements (e.g., vertices) described in the header 404, and the first converted metrology data 123A indicates values of the properties of the data elements described in the header 404. To illustrate, the first converted metrology data 123A includes a first data element (e.g., "0 0 0") having a first property (e.g., x), a second property (e.g., y), and a third property (e.g., z) of the type (e.g., float) indicated in the header 404. The first data adapter 142 generates the third data 143A by converting the first converted metrology data 123A having the common format to the third data 143A having a second format that is supported by the manufacturing system 164. In a particular aspect, the second data adapter 144, the third data adapter 146, and the fourth data adapter 148 generate the fourth data 145A, the fifth data 147A, and the sixth data 149A, respectively, by converting the first converted metrology data 123A to corresponding formats. The manufacturing system 164 generates the command 165 based on the third data 143, as described with reference to FIG. 1. For example, the command 165 indicates that the manufacturing device 166 is to move the aircraft part 300 a particular distance (e.g., 2) in a particular direction (e.g., along a y-axis).

Subsequent to the manufacturing device 166 moving the aircraft part 300 responsive to the command 165, the first MD 102 generates the first metrology data 103B indicating coordinates of the reflectors of the aircraft part 300. The first MD data adapter 122 generates the first converted metrology data 123B by converting the first metrology data 103B having the first format to the first converted metrology data 123B having the common format. The first data adapter 142 generates the third data 143B by converting the first converted metrology data 123B having the common format to the third data 143B having the second format that is supported by the manufacturing system 164. In a particular aspect, the second data adapter 144, the third data adapter 146, and the fourth data adapter 148 generate the fourth data 145B, the fifth data 147B, and the sixth data 149B, respectively, by converting the first converted metrology data 123B to corresponding formats. In a particular aspect, the manufacturing system 164 determines, based on a comparison of the third data 143B to the specification, that the third data 143B satisfies the specification. In a particular example, the manufacturing system 164, in response to determining that the third data 143B satisfies the specification, generates a GUI indicating that the specification is satisfied and provides the GUI to a display. In another example, the manufacturing system 164, in response to determining that the third data 143B satisfies the specification and that the specification indicates that another type of metrology data is to be analyzed, sends a trigger message to the second MD data adapter 124 associated with the other type of metrology data. The service interface 152, the IT business logic 154, the metrology database 156, the maintenance health database 158, the manufacturing system 164, or a combination thereof are metrology device agnostic. For example, the service interface 152, the IT business logic 154, the metrology database 156, the maintenance health database 158, the manufacturing system 164, or a combination thereof receive metrology data in supported formats irrespective of the first format of the first metrology data 103 generated by the first MD 102.

Figure 5:
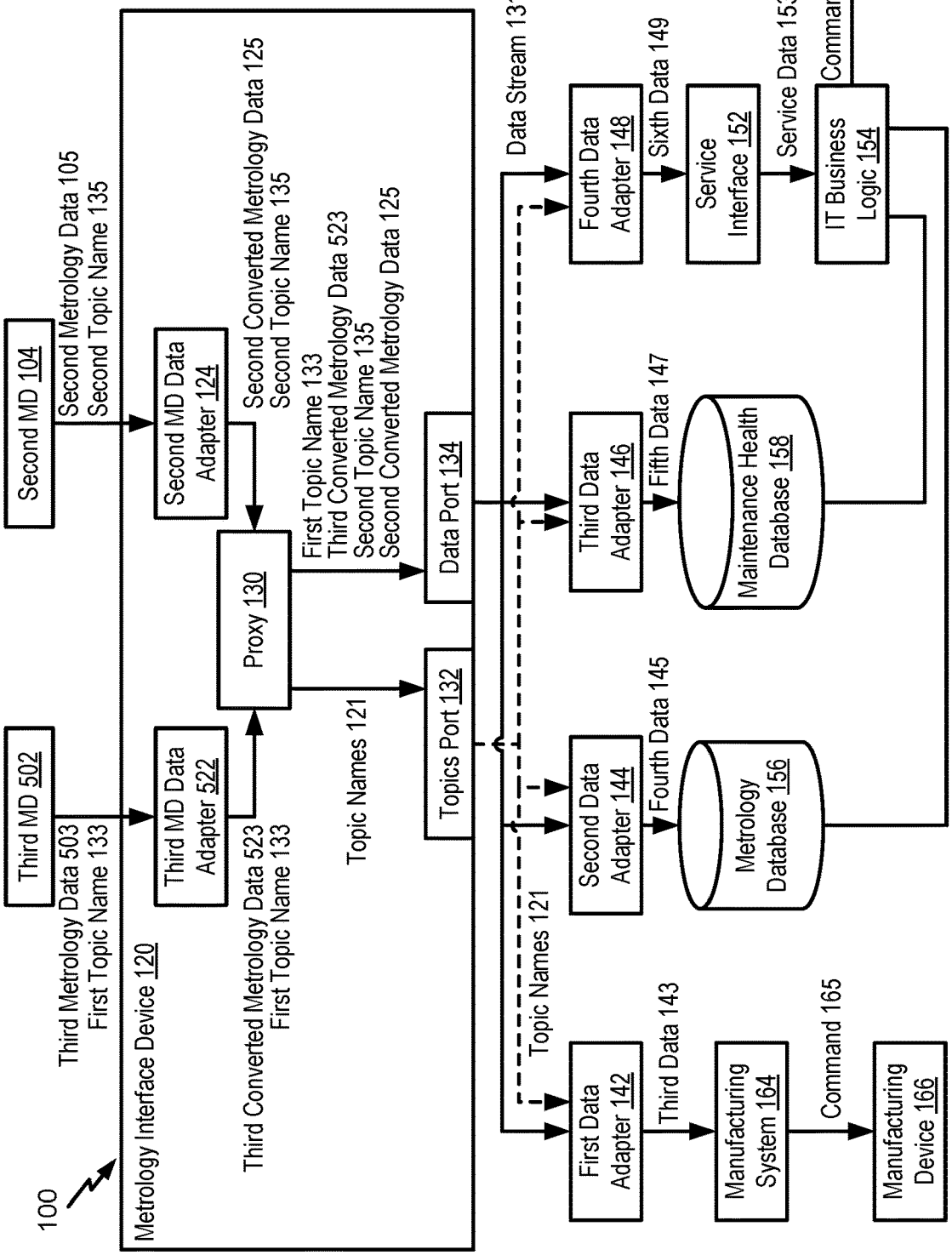
FIG. 5 is a diagram that illustrates a particular aspect of the system of FIG. 1.

Referring to FIG. 5, a diagram illustrating aspects of the system 100 is shown. The system 100 in FIG. 5 includes a third MD data adapter 522 configured to communicate with the third MD 502. Thus, FIG. 5 illustrates the circumstance of the first MD 102 of FIG. 1 being replaced with the third MD 502.

In a particular aspect, the third MD 502 generates metrology data of the same type (e.g., coordinate data) as generated by the first MD 102. Thus, the third MD 502 can act as a replacement for the first MD 102 of FIG. 1. The third MD 502 can be the same type of device (e.g., a laser tracker) as the first MD 102, or the third MD 502 can be a device type (e.g., a camera) that is distinct from a second device type of the first MD 102 (e.g., a laser tracker). Further, the third MD 502 can output metrology data in the same data format as the first MD 102, or the third MD 502 can output metrology data in a different data format than the first MD 102.

In a particular aspect, the metrology interface device 120 receives user input indicating that the third MD 502 has replaced the first MD 102. In response to receiving the user input, the metrology interface device 120 assigns topic names associated with the first MD data adapter 122 to the third MD data adapter 522. For example, the metrology interface device 120 associates the first topic name 133 to the third MD data adapter 522. In this aspect, the metrology interface device 120 can also send a trigger message indicating the first topic name 133 to the third MD 502 to initiate metrology data generation.

The third MD 502 generates third metrology data 503 in response to the trigger. For example, the third metrology data 503 indicates coordinates of one or more targets located on the aircraft part 300 of FIG. 3. In a particular implementation, the third MD 502 (e.g., a camera) takes pictures of the reflectors 312-320 of FIG. 3 and performs photogrammetry analysis to determine the coordinates of the reflectors 312-320 based on the pictures. For example, the third metrology data 503 (e.g., "First Coordinates: 0, 2, 0 Second Coordinates: 1, 2, 0") indicates first coordinates (e.g., 0, 2, 0) of the reflector 312, second coordinates (e.g., 1, 2, 0) of the reflector 314, additional coordinates, or a combination thereof. The third MD 502 provides the third metrology data 503, the first topic name 133, or both, to the third MD data adapter 522.

The third MD data adapter 522 generates third converted metrology data 523 by converting the third metrology data 503 to the third converted metrology data 523 having the common format. The third MD data adapter 522 provides the third converted metrology data 523, the first topic name 133, or both, to the proxy 130. In a particular aspect, the proxy 130 updates (or generates) the topic names 121 to indicate the first topic name 133. The proxy 130 enables the topic names 121 to be accessible via the topics port 132. For example, the proxy 130 outputs the topic names 121 via the topics port 132. The proxy 130 enables the third converted metrology data 523 to be accessible via the data port 134. For example, the proxy 130 adds the third converted metrology data 523 to the data stream 131.

The first data adapter 142 extracts the third converted metrology data 523 from the data stream 131 in response to determining that the third converted metrology data 523 is associated with the first topic name 133. The first data adapter 142 generates the third data 143 by converting the third converted metrology data 523 from the common format to the third data 143 having the second format supported by the manufacturing system 164. The manufacturing system 164 determines whether a condition is detected based on a comparison of the third data 143 to a specification. The manufacturing system 164 generates the command 165 in response to determining that the condition is detected. The system 100 thus enables the first MD 102 to be replaced with the third MD 502 without changing the service interface 152, the IT business logic 154, the metrology database 156, the maintenance health database 158, the manufacturing system 164, or a combination thereof.

Figure 6:
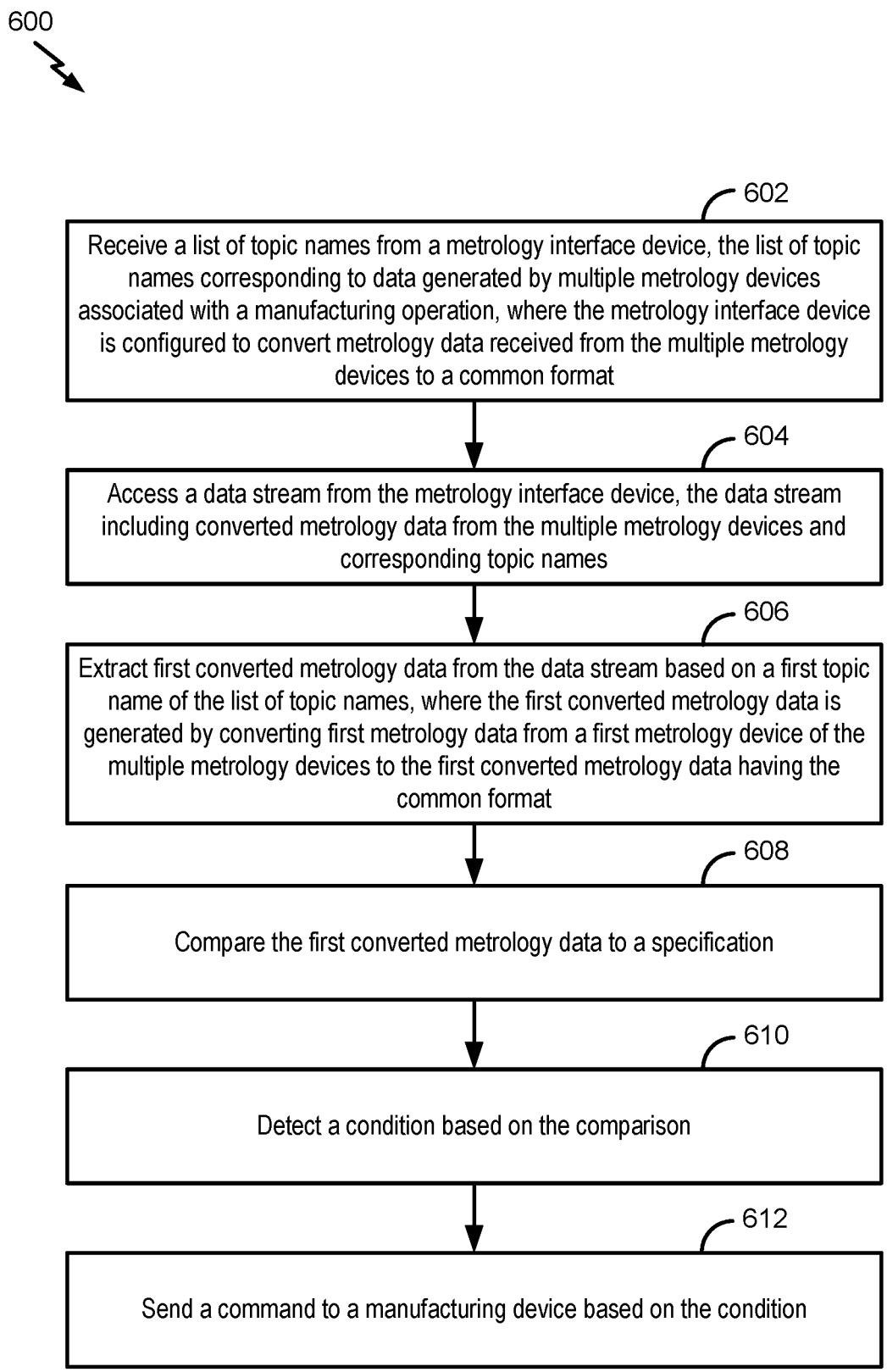
FIG. 6 is a flow chart that illustrates an example of a method of manufacturing device control based on metrology data.

FIG. 6 is a flowchart of a method 600 of performing manufacturing device control based on metrology data. The method 600 can be performed by one or more of the first data adapter 142, the second data adapter 144, the third data adapter 146, the fourth data adapter 148, the service interface 152, the IT business logic 154, the metrology database 156, the maintenance health database 158, the manufacturing system 164, or the system 100 of FIG. 1.

The method 600 includes receiving a list of topic names from a metrology interface device, at 602. For example, the first data adapter 142 of FIG. 1 receives the topic names 121 from the metrology interface device 120, as described with reference to FIG. 1. The topic names 121 correspond to data generated by multiple metrology devices associated with a manufacturing operation. For example, the topic names 121 include the first topic name 133 and the second topic name 135 corresponding to the first metrology data 103 and the second metrology data 105, respectively. The first metrology data 103 is generated by the first MD 102, and the second metrology data 105 is generated by the second MD 104. The first MD 102 and the second MD 104 are associated with a manufacturing operation (e.g., an alignment operation). The metrology interface device 120 is configured to convert metrology data received from the multiple metrology devices to a common format. For example, the metrology interface device 120 is configured to convert the first metrology data 103 to the first converted metrology data 123 having the common format and to convert the second metrology data 105 to the second converted metrology data 125 having the common format.

The method 600 also includes accessing a data stream from the metrology interface device, at 604. For example, the first data adapter 142 of FIG. 1 accesses the data stream 131 from the metrology interface device 120. The data stream 131 includes converted metrology data from the multiple metrology devices and corresponding topic names. For example, the data stream 131 includes the first converted metrology data 123 and the first topic name 133. As another example, the data stream 131 includes the second converted metrology data 125 and the second topic name 135.

The method 600 further includes extracting first converted metrology data from the data stream based on a first topic name of the list of topic names, at 606. For example, the first data adapter 142 extracts the first converted metrology data 123 from the data stream 131 based on the first topic name 133. The first converted metrology data 123 is generated by converting the first metrology data 103 from the first MD 102 to the first converted metrology data 123 having the common format. It should be understood that "first" and "second" are used herein as prefixes to distinguish between terms and do not inherently imply a position or an order. For example, the first topic name 133 could be included in any position in the topic names 121.

The method 600 also includes comparing the first converted metrology data to a specification, at 608. For example, the manufacturing system 164 of FIG. 1 compares the first converted metrology data 123 to a specification. In a particular aspect, comparing the first converted metrology data 123 to the specification includes converting the first converted metrology data 123 to the third data 143 and comparing the third data 143 to the specification, as described with reference to FIG. 1.

The method 600 further includes detecting a condition based on the comparison, at 610. For example, the manufacturing system 164 of FIG. 1 detects a condition based on the comparison of the first converted metrology data 123 to the specification, as further described with reference to FIG. 1.

The method 600 also includes sending a command to a manufacturing device based on the condition, at 612. For example, the manufacturing system 164 of FIG. 1 sends the command 165 to the manufacturing device 166 based on the condition, as further described with reference to FIG. 1.

The method 600 thus enables the manufacturing system 164 to be metrology device agnostic by converting the first metrology data 103 generated by the first MD 102 to the common format. The first MD 102 and the metrology interface device 120 is manufacturing system agnostic because (for example) an additional manufacturing system can access the first converted metrology data 123 by extracting the first converted metrology data 123 from the data stream 131 without changing the first MD 102 or the metrology interface device 120.

Figure 7:
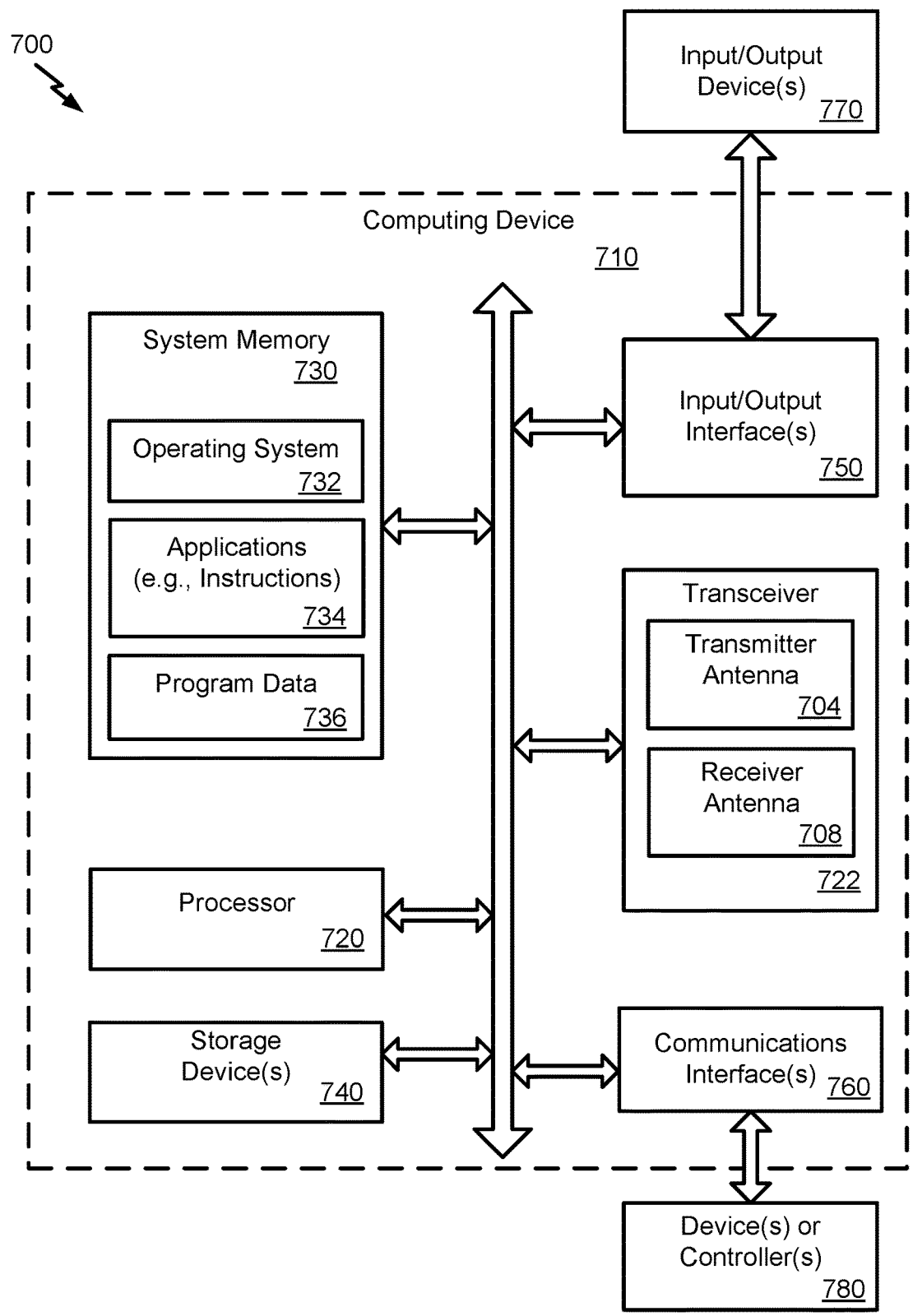
FIG. 7 is a block diagram that depicts a computing environment including a general purpose computing device configured to support aspects of computer-implemented methods and computer-executable program instructions (or code) according to the present disclosure.

FIG. 7 is an illustration of a block diagram of a computing environment 700 including a general purpose computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6.

The computing device 710 includes the transceiver 722. The transceiver 722 includes a transmitter antenna 704 and a receiver antenna 708. The computing device 710 includes a processor 720. The processor 720 is configured to communicate with system memory 730, one or more storage devices 740, one or more input/output interfaces 750, one or more communications interfaces 760, or a combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic/input output system for booting the computing device 710 as well as a full operating system to enable the computing device 710 to interact with users, other programs, and other devices. The system memory 730 stores system (program) data 736.

The system memory 730 includes one or more applications 734 executable by the processor 720. As an example, the one or more applications 734 include instructions executable by the processor 720 to initiate, control, or perform one or more operations described with reference to FIGS. 1-6. To illustrate, the one or more applications 734 include instructions executable by the processor 720 to initiate, control, or perform one or more operations described with reference to the first MD 102, the second MD 104, the metrology interface device 120, the first MD data adapter 122, the second MD data adapter 124, the proxy 130, the first data adapter 142, the second data adapter 144, the third data adapter 146, the fourth data adapter 148, the manufacturing system 164, the metrology database 156, the maintenance health database 158, the service interface 152, the manufacturing device 166, the IT business logic 154, the factory level system(s) 162, or a combination thereof.

The processor 720 is configured to communicate with one or more storage devices 740. For example, the one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications, and program data. In a particular aspect, the system memory 730, the storage devices 740, or both, include tangible computer-readable media. In a particular aspect, the storage devices 740 include the metrology database 156, the maintenance health database 158, or both. In a particular aspect, one or more of the storage devices 740 are external to the computing device 710.

The processor 720 is configured to communicate with one or more input/output interfaces 750 that enable the computing device 710 to communicate with one or more input/output devices 770 to facilitate user interaction. The processor 720 is configured to detect interaction events based on user input received via the input/output interfaces 750. Additionally, the processor 720 is configured to send a display to a display device via the input/output interfaces 750. The processor 720 is configured to communicate with devices or controllers 780 via the one or more communications interfaces 760. For example, the one or more communication interfaces 760 include the topics port 132, the data port 134 of FIG. 1, or both. In an illustrative example, a non-transitory computer-readable storage medium (e.g., the system memory 730) includes instructions that, when executed by a processor (e.g., the processor 720), cause the processor to initiate, perform, or control operations. The operations include one or more operations described with reference to FIGS. 1-6.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving a list of topic names from a metrology interface device, the list of topic names corresponding to data generated by multiple metrology devices associated with a manufacturing operation, wherein the metrology interface device is configured to convert metrology data received from the multiple metrology devices to a common format;
   subsequent to receiving the list of topic names, accessing a data stream from the metrology interface device, the data stream including converted metrology data from the multiple metrology devices and corresponding topic names;
   extracting first converted metrology data from the data stream based on a first topic name of the list of topic names, wherein the first converted metrology data is generated by converting first metrology data from a first metrology device of the multiple metrology devices to the first converted metrology data having the common format;
   comparing the first converted metrology data to a specification;
   detecting a condition based on the comparison; and
   sending a command to a manufacturing device based on the condition.

2. The method of claim 1, further comprising sending a trigger message, via the metrology interface device, to the first metrology device, wherein the first topic name is generated based on the trigger message.

3. The method of claim 2, further comprising sending the trigger message based on detecting a second condition associated with the manufacturing operation.

4. The method of claim 1, wherein the list of topic names is received from a port of the metrology interface device.

5. The method of claim 1, wherein the common format includes a common file format, common units of measurement, a common coordinate system, a common point of reference, a common data template, or a combination thereof.

6. The method of claim 1, further comprising:
   extracting second converted metrology data from the data stream based on a second topic name of the list of topic names, the second converted metrology data generated by converting second metrology data from a second metrology device of the multiple metrology devices, wherein the second topic name is associated with the second metrology device; and
   comparing the second converted metrology data to the specification,
   wherein the condition is detected further based on the comparison of the second converted metrology data to the specification.

7. The method of claim 6, wherein the first metrology data corresponds to a first coordinate system, wherein the second metrology data corresponds to a second coordinate system, wherein the first converted metrology data corresponds to a third coordinate system, and wherein the second converted metrology data corresponds to the third coordinate system.

8. The method of claim 1, wherein the first metrology data indicates a first location of a first reflector within a three-dimensional (3D) coordinate system.

9. The method of claim 1, wherein the first topic name is independent of the first metrology device that generates the first metrology data.

10. The method of claim 1, further comprising:
    extracting third converted metrology data from the data stream based on the first topic name, the third converted metrology data generated by converting third metrology data from a third metrology device of the multiple metrology devices;
    comparing the third converted metrology data to the specification; and
    determining whether a second condition is detected based on the comparison of the third converted metrology data to the specification.

11. The method of claim 1, further comprising storing the first converted metrology data in one or more databases.

12. The method of claim 1, wherein the metrology interface device adds the first topic name to the list of topic names in response to receiving a topic definition indicating the first topic name from the first metrology device.

13. The method of claim 1, wherein the metrology interface device converts the first metrology data to the first converted metrology data based on a first device type of the first metrology device.

14. The method of claim 1, wherein generating the first converted metrology data from the first metrology data includes at least one of downsampling, smoothing, error trapping, or data analysis.

15. A device comprising:
a first communication interface configured to:
receive a list of topic names via a first port of a metrology interface device, the list of topic names corresponding to data generated by multiple metrology devices associated with a manufacturing operation, wherein the metrology interface device is configured to convert metrology data received from the multiple metrology devices to a common format; and
access a data stream via a second port of the metrology interface device, the data stream including converted metrology data from the multiple metrology devices and corresponding topic names, wherein the second port is distinct from the first port;
a processor configured to:
extract first converted metrology data from the data stream based on a first topic name of the list of topic names, the first converted metrology data generated by converting first metrology data from a first metrology device of the multiple metrology devices to the first converted metrology data having the common format;
compare the first converted metrology data to a specification; and
detect a condition based on the comparison; and
a second communication interface configured to send a command to a manufacturing device based on the condition.

16. The device of claim 15, wherein the first communication interface is further configured to send a trigger message to the first metrology device, wherein the first topic name is generated based on the trigger message.

17. The device of claim 15, wherein the list of topic names is readable from a memory register via the first port of the metrology interface device.

18. A computer-readable storage device storing instructions that, when executed by a processor, cause the processor to perform operations comprising:
receiving a list of topic names from a metrology interface device, the list of topic names corresponding to data generated by multiple metrology devices associated with a manufacturing operation, wherein the metrology interface device is configured to convert metrology data received from the multiple metrology devices to a common format;
subsequent to receiving the list of topic names, accessing a data stream from the metrology interface device, the data stream including converted metrology data from the multiple metrology devices and corresponding topic names;
extracting first converted metrology data from the data stream based on a first topic name of the list of topic names, the first converted metrology data generated by converting first metrology data from a first metrology device of the multiple metrology devices to the first converted metrology data having the common format;
comparing the first converted metrology data to a specification;
detecting a condition based on the comparison; and
sending a command to a manufacturing device based on the condition.

19. The computer-readable storage device of claim 18, wherein the list of topic names is received from a first port of the metrology interface device, wherein the data stream is accessed via a second port of the metrology interface device, wherein the second port is distinct from the first port, and wherein content from a circular buffer is accessible via the second port as the data stream.

20. The computer-readable storage device of claim 18, wherein the operations further comprise:
extracting second converted metrology data from the data stream based on a second topic name of the list of topic names, the second converted metrology data generated by converting second metrology data from a second metrology device of the multiple metrology devices, wherein the second topic name is associated with the second metrology device;
comparing the second converted metrology data to a second specification; and
detecting a second condition based on the comparison of the second converted metrology data to the second specification, wherein the command is sent to the manufacturing device further based on the second condition.

* * * * *